United States Patent [19]

Hassan et al.

[11] Patent Number: 5,995,533

[45] Date of Patent: *Nov. 30, 1999

[54] APPARATUS AND METHOD FOR GENERATING PSEUDORANDOM QUANTITIES BASED UPON RADIO CHANNEL CHARACTERISTICS

[75] Inventors: Amer Aref Hassan, Cary, N.C.; John Erik Hershey, Ballston Lake, N.Y.; Sandeep Chennakeshu, Cary, N.C.

[73] Assignee: Ericsson Inc., Research Triangle Park, N.C.

[*] Notice: This patent is subject to a terminal disclaimer.

[21] Appl. No.: 08/555,968

[22] Filed: Nov. 13, 1995

Related U.S. Application Data

[63] Continuation-in-part of application No. 08/376,144, Jan. 20, 1995, Pat. No. 5,604,806.

[51] Int. Cl.$^6$ .................................................. H04B 15/00
[52] U.S. Cl. ............................. 375/200; 380/44; 380/48
[58] Field of Search ........................... 375/200, 202, 375/208, 219, 220, 295, 316, 205; 380/28, 44, 48; 364/715.11; 340/825.3

[56] References Cited

U.S. PATENT DOCUMENTS

| | | |
|---|---|---|
| 3,603,734 | 9/1971 | Woodbead . |
| 5,206,881 | 4/1993 | Messenger et al. . |
| 5,243,649 | 9/1993 | Franson ........................................ 380/9 |
| 5,307,410 | 4/1994 | Bennett ...................................... 380/21 |
| 5,469,471 | 11/1995 | Wheatley, III .......................... 375/205 |
| 5,528,526 | 6/1996 | Klug et al. .......................... 364/715.11 |
| 5,537,102 | 7/1996 | Pinnow ................................. 340/825.3 |
| 5,546,464 | 8/1996 | Raith et al. ................................ 380/48 |
| 5,568,301 | 10/1996 | Tiemann et al. . |
| 5,577,122 | 11/1996 | Schipper et al. ........................... 380/28 |
| 5,604,806 | 2/1997 | Hassan et al. .............................. 380/44 |

FOREIGN PATENT DOCUMENTS

| | | |
|---|---|---|
| 457 602 | 11/1991 | European Pat. Off. . |
| WO94/18774 | 8/1994 | WIPO . |
| WO95/07584 | 3/1995 | WIPO . |
| WO96/08093 | 3/1996 | WIPO . |

OTHER PUBLICATIONS

The Wire–Tap Channel, A. D. Wyner, *The Bell System Technical Journal*, vol. 54, No. 8, pp. 1355–1387, Oct. 1975.

Secret Key Agreement by Public Discussion from Common Information, Ueli M. Maurer, Member, IEEE, *IEEE Transactions on Information Theory*, vol. 39, No. 3, pp. 733–742, May 1993.

Wire–Tap Channel II, L. H. Ozarow and A. D. Wyner, *AT& T Bell Laboratories Technical Journal*, vol. 63, No. 10, pp. 2135–2157, Dec. 1984.

Common Randomness in Information Theory and Cryptography—Part I: Secret Sharing, Rudolph Ahlswede and Imre Csiszar, Fellow, IEEE, *IEEE Transactions on Information Theory*, vol. 39, No. 4, pp. 1121–1132, Jul. 1993.

Partial International Search Report, International Appln. No. PCT/US96/00868 Date of mailing: Aug. 23, 1996.

*Primary Examiner*—Wellington Chin
*Assistant Examiner*—Congvan Tran
*Attorney, Agent, or Firm*—Burns, Doane, Swecker & Mathis, L.L.P.

[57] ABSTRACT

Characteristics of the radio channel are used to establish pseudorandom sequences for use in communicating information. These characteristics are the short-term reciprocity and rapid spatial decorrelation of phase of the radio channel. Due to the reciprocal nature of these radio channel characteristics, the transceivers which are communicating via the radio channel will generally both determine the same sequence. Although the determined sequences are not always sufficiently random for use in pseudorandom functions, a randomness tester can be provided to discard those sequences which are not sufficiently random. Exemplary pseudorandom communication functions include the selection of a spreading sequence in CDMA systems and the selection of a hopping sequence in a TDMA or CDMA system.

44 Claims, 12 Drawing Sheets

APPARATUS AND METHOD FOR GENERATING PSEUDORANDOM QUANTITIES BASED UPON RADIO CHANNEL CHARACTERISTICS

This application is a continuation-in-part of U.S. patent application No. 08/376,144, which was filed Jan. 20, 1995, U.S. Pat. No. 5,604,806, and which is expressly incorporated here by reference.

BACKGROUND

Applicants' invention relates to apparatus and methods for using radio channel characteristics to generate pseudo-random quantities at plural transceivers that can be used, for example, as spreading sequences in communicating using code division multiplexing or code division multiple access (CDMA) systems or as frequency hopping sequences in time division multiple access (TDMA) or CDMA systems.

The widespread need for secure communication in radio communication systems is apparent. As just two examples, information relating to financial transactions is routinely exchanged by radio, and law enforcement officers often must communicate voice and/or data by radio. In both examples, it is critical that the communication be conducted with almost perfect secrecy, despite potential eavesdroppers' having access to strong information signals. Users of cellular radiotelephones also desire privacy in their communications, which may travel on links between mobile phones and base stations or on direct links between mobiles.

One way of providing security is to encrypt the communicated information according to some system that the users have agreed in advance to use. Several encryption methods have been described in the literature, such as the data encryption standard (DES) and public key cryptography (PKC). As explained in W. Diffie et al., "Privacy and Authentication: An Introduction to Cryptography", *Proc. IEEE* vol. 67, pp. 397–427 (March 1979), a classical cryptographic system is in general a set of instructions, a piece of hardware, or a computer program that can convert plain text (unencrypted information) to ciphertext, or vice versa, in a variety of ways, one of which is selected by a specific key that is known to the users but is kept secret from others. The DES is a classical cryptographic system.

Popular PKC systems make use of the fact that finding large prime numbers is computationally easy but factoring the products of two large prime numbers is computationally difficult. PKC systems have an advantage over other cryptographic systems like the DES in that a PKC system uses a key for decryption that is different from the key for encryption. Thus, a PKC user's encryption key can be published for use by others, and the difficulty of securely distributing keys is avoided. See, e.g., R. I. Rivest et al., "A Method of Obtaining Digital Signatures and Public-Key Cryptosystems", *Commun. of the ACM* vol. 21, pp. 120–126 (February 1978); and W. Diffie, "The First Ten Years of Public-Key Cryptography", *Proc. IEEE* vol. 76, pp. 560–577 (May 1988).

For either a classical or PKC system, the security of a message is dependent to a great extent on the length of the key, as described in C. E. Shannon, "Communication Theory of Secrecy Systems", *Bell Sys. Tech. J.* vol. 28, pp. 656–715 (October 1949).

Unfortunately, it is often the case that two users (two police officers, for instance) do not share a secret key a priori, making secure real-time communication via a classical crytographic system impossible. Even a PKC system requires a user to generate a pseudo-random quantity. Moreover, popular PKC systems are unprovably secure, and suffer from severe requirements in computational complexity and amount of information that must be exchanged. As new ways of attacking PKC systems are mounted, PKC systems will retreat to ever longer exchange vectors (in effect, larger prime numbers) and ever more complex computations. As a result, classical and PKC cryptographic systems are less than ideal for many communication situations.

Complicating the task of any radio communication system is the variability of the radio channel caused by atmospheric disturbances, relative motion of the system users, changing radio signal reflections from structures and vehicles, etc. Such channel variability contributes to errors in the information communicated, and much effort is expended to overcome these errors. For example, some cellular radiotelephone systems convert analog information to be transmitted into digital information, which is then transformed according to a block error correction code. Such a cellular radio system is specified in TIA/EIA/IS-95-A, which is an interim standard published by the Telecommunications Industry Association and Electronic Industries Association (TIA/EIA) for a North American CDMA communication system and the disclosure of which is incorporated here by reference.

In such a CDMA system, each radio channel, or radio carrier signal having a particular frequency, corresponds to a respective spreading sequence of digital bits that is used for encoding a sequence of information bits from a data source, e.g., a digitally encoded portion of a voice conversation. The information sequence to be communicated is spread, or mapped, into a longer sequence by combining the information sequence with the spreading sequence. As a result, one or more bits of the information sequence are represented by a sequence of N "chip" values. The sequence of chips, i.e., the spread information sequence, is then used to modulate the frequency of the radio carrier signal.

For example, at a transmitter, a binary information symbol b (±1) can be spread by multiplying b with a spreading sequence x; for example, the spreading sequence x might be +1, −1, +1, −1, consisting of four binary chips. In essence, the spreading process replaces each binary information symbol with a four-chip spread symbol: +1, −1, +1, −1 when b=+1; and −1, +1, −1, +1 when b=−1. In this process called "direct spreading", each spread symbol is essentially the product of an information symbol and the spreading sequence.

In a second form of spreading called "indirect spreading", the different possible information symbols are replaced by different, not necessarily related, spreading sequences. Such mapping from information symbol to spread symbol can be viewed as a form of block coding. In the general case, a single M-ary information symbol, i.e., a symbol that can take on any of M possible values, is mapped to one of M possible spread symbols. In the binary case, the symbol b=+1 might be replaced by the sequence x=+1, −1, +1, −1, and the symbol b=−1 might be replaced by the sequence y=+1, +1, −1, −1.

In either direct or indirect spreading, the information symbol may be derived from a differential symbol d. For example, a binary information symbol b at a time n (denoted b(n)) may be determined by the information symbol at a time n−1 (denoted b(n−1)) and a differential information symbol d at the time n (denoted d(n)) according to the following relationship:

$$b(n)=b(n-1)d(n)$$

which gives:

$$d(n)=b(n)b^*(n-1)$$

where * denotes complex conjugate. Also, it will be understood that the information symbols described above may be produced by preceding stages of channel coding and/or spreading.

An advantage of such spreading is that information from many sources can be transmitted at the same time in the same radio frequency band, provided the spreading sequences used to represent the different sources' information sequences do not interfere with one another too much. In effect, the different spreading sequences correspond to different communication "channels".

Various aspects of conventional CDMA communications are described in K. Gilhousen et al., "On the Capacity of a Cellular System," *IEEE Trans. Veh. Technol.* vol. 40, pp. 303–312 (May 1991). Other aspects of CDMA communication systems are described in U.S. patent application No. 08/291,693 filed Aug. 16, 1994, by Bottomley et al. for "Multiple Access Coding using Bent Sequences for Mobile Radio Communications", and in the following U.S. patent documents: U.S. Pat. No. 5,151,919 to Dent; and U.S. Pat. No. 5,353,352 to Dent et al.; and allowed U.S. patent application No. 08/155,557 filed Nov. 22, 1993. These patents and patent applications are expressly incorporated here by reference.

To minimize interference among the channels due to their overlap in time and frequency, the spreading sequences should be as random as possible (and thus the CDMA channels) can also be mutually orthogonal, i.e., the cross-correlations of the spreading sequences must be zero. (Two binary sequences are orthogonal if they differ in exactly one-half of their bit positions.) On the other hand, there are only N orthogonal spreading sequences of length N.

It may be recognized that spreading an information sequence by combining it with one of a set of orthogonal spreading sequences is similar to the common process of block coding. In many communication systems, an information sequence to be communicated is block-coded for correcting errors. In orthogonal block coding, a number N of information bits are converted to one of $2^N$ N-bit orthogonal codewords. Decoding such an orthogonal codeword involves correlating it with all members of the set of $2^N$ codewords. The binary index of the codeword giving the highest correlation yields the desired information. For example, if the correlations of a received 16-bit codeword with each of the set of sixteen orthogonal 16-bit codewords having indices 0–15 produce the highest correlation on the tenth codeword, the underlying information signal is the 4-bit binary codeword 1010 (which is the integer ten in decimal notation). Such a code is called a [16,4] orthogonal block code. By inverting all of the bits of the codewords, one further bit of information may be conveyed per codeword. This type of coding is known as bi-orthogonal block coding.

A significant feature of such coding is that simultaneous correlation with all the orthogonal block codewords in a set may be performed efficiently by means of a Fast Walsh Transform (FWT) device. In the case of a [128,7] block code, for example, 128 input signal samples are transformed into a 128-point Walsh spectrum in which each point in the spectrum represents the value of the correlation of the input signal samples with one of the codewords in the set. A suitable FWT processor is described in U.S. Pat. No. 5,357,454 to Dent, which is incorporated here by reference.

As noted above, the typical CDMA system spreads an information sequence into block error correction codewords, and then combines the block codewords with a code sequence that is unique to each user. In the system described in U.S. Pat. No. 5,353,352, the block codewords are combined with a scramble mask that does not further spread the information sequence.

Another technique for combatting interference in CDMA systems (or TDMA systems) is known as frequency hopping. Frequency hopping is a technique for ensuring that worst case interference scenarios do not prevail for longer than one frequency hop interval, rather than for the duration of an entire connection by changing the carrier frequency used on which data symbols associated with the connection are modulated. This characteristic is commonly known as interferer diversity. Frequency hopping also provides frequency diversity that combats fading for slowly moving mobile stations. Moreover, frequency hopping can also be used to eliminate the difficult task of frequency planning, which is of special importance in microcells. This can be achieved if all of the cells in a system use the same frequencies but each cell has a different hop sequence. Such systems have been called Frequency Hopping Multiple Access (FHMA) systems.

In a frequency hopping system each cell can use all of the available frequencies, but at different times, as determined by a pseudo-random frequency hop sequence generator. Such generators can be constructed several ways, e.g., to yield a random probability that any two cells choose the same frequency at the same time (known as non-orthogonal hopping), to guarantee that specified cells or mobile stations never choose the same frequency at the same time (known as orthogonal hopping), or to obtain a mixture of the preceding two techniques (e.g., signals in the same cell hop orthogonally, while being non-orthogonal relative to signals in adjacent cells).

Spreading sequences in CDMA systems and frequency hopping sequences in TDMA or CDMA systems have in common a desired pseudorandom characteristic which is designed to aid in reducing overall system interference. Conventional systems generate these types of sequences using pseudorandom number generators. These pseudorandom number generators have several drawbacks. For example, they typically are limited in the number of pseudorandom sequences that they can generate. Moreover, these devices require extensive memories for facilitating sequence generation. Yet another drawback to the use of pseudorandom number generators as components of base stations and mobile stations in radiocommunication systems is that they must use an elaborate scheme of common inputs to ensure that a base station and a mobile station that are communicating with one another generate the same pseudorandom sequence so that they can, for example, properly spread and despread CDMA composite signals.

SUMMARY

In accordance with Applicants' invention, characteristics of the radio channel are used to establish and exchange pseudorandom quantities which can be used by transmitters and receivers to perform various signal processing functions, e.g., spreading, despreading and frequency hopping sequence generation. These characteristics are the short-term reciprocity and rapid spatial decorrelation of phase of the radio channel. In other words, for a short period of time (on the order of a few milliseconds), the impulse response of a radio channel viewed from an antenna located at a position A to an antenna located at a position B is the same as the impulse response of the channel viewed from position B to position A, excluding thermal noise. The pseudorandom quantities can be established with computations equivalent to a bounded distance decoding procedure, and the determined pseudorandom quantity may be used for processing the subsequent data transmission.

Applicants have also recognized, that the measured quantities may not always be sufficiently random for use as pseudorandom quantities in signal processing such as spreading and frequency hopping. For example, there may be sequences which are generated that have strings of binary zeros and ones that render them unsuitable for use as pseudorandom sequences. Thus, according to one aspect of the present invention, the sequences which are generated based upon an analysis of radio channel characteristics are further screened to ensure that they are sufficiently random for use in various signal processing techniques. For example, a randomness tester can be employed on the sequences which are established as described herein.

In one aspect, Applicants' invention provides a method of establishing a pseudorandom sequence for processing signals involved in a connection between a first radio transceiver and a second radio transceiver comprising the steps of, in the first radio transceiver, transmitting a plurality of sinusoidal signals, each sinusoidal signal having a respective predetermined frequency and a predetermined initial phase; and in the second radio transceiver, detecting the plurality of sinusoidal signals transmitted by the first radio transceiver, and transmitting the plurality of sinusoidal signals after a predetermined time period. This method further includes, in each of the first and second radio transceivers, the steps of determining a phase of each of the plurality of sinusoidal signals received from the other radio transceiver; determining differences between the phases of pairs of the sinusoidal signals received; quantizing each difference into a respective one of a plurality of phase decision values; and using a plurality of the quantized differences as a pseudorandom sequence in subsequent signal processing.

The method may further include the step of testing the randomness of the established sequence prior to using the sequence in subsequent signal processing. Other methods and systems for generating and using pseudorandom quantities based on radio channel characteristics are described herein.

BRIEF DESCRIPTION OF THE DRAWINGS

Applicants' invention is described below in more detail with reference to embodiments that are given only by way of example and that are illustrated in the accompanying drawings, in which.

DETAILED DESCRIPTION

While the following description is in the context of cellular communication systems involving portable or mobile radiotelephones and/or personal communication networks, it will be understood by those skilled in the art that Applicants' invention may be applied to other communication applications.

SYSTEM OVERVIEW

Figure 1A:
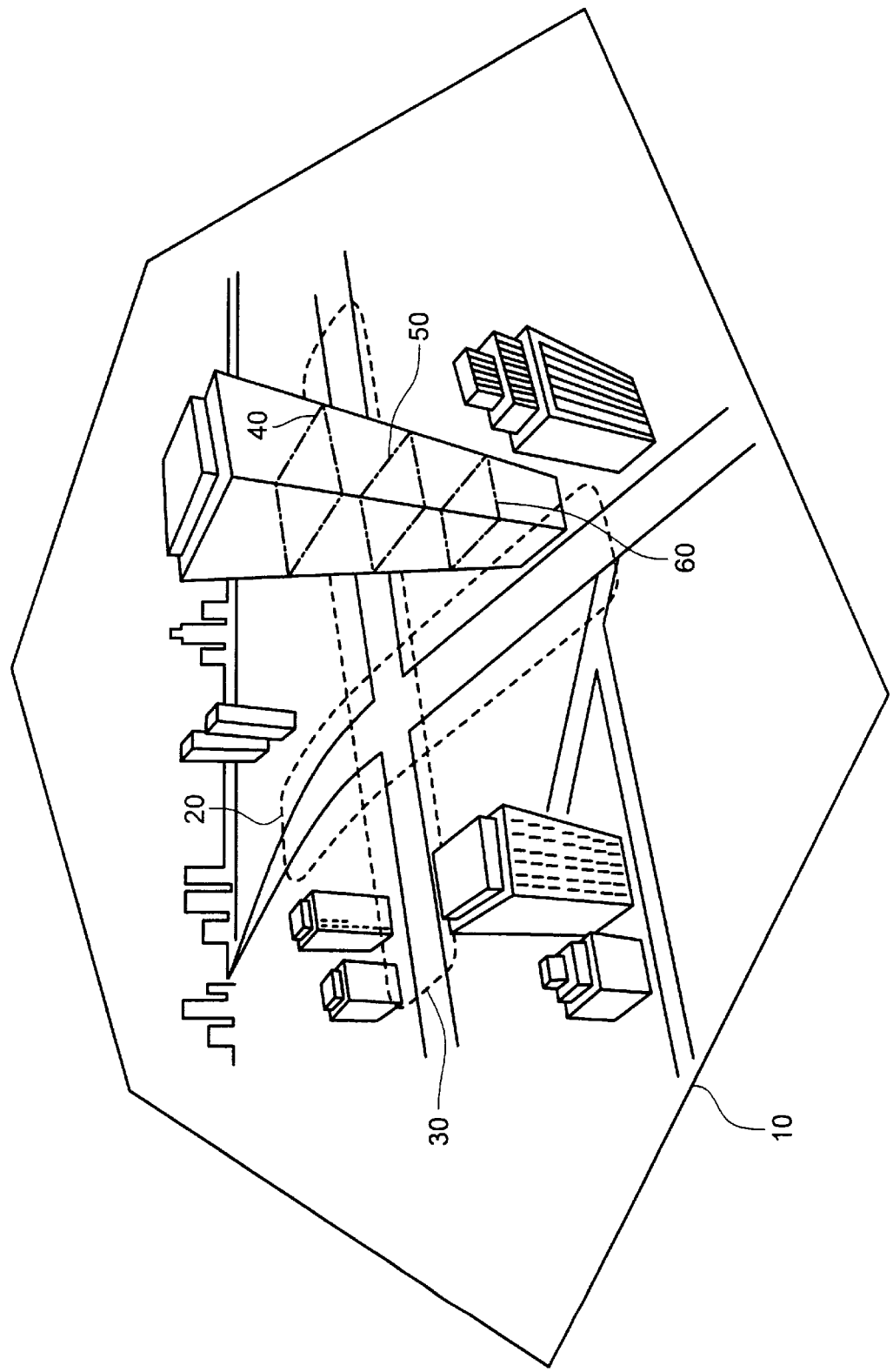
FIGS. 1A, 1B illustrate an exemplary multi-layered cellular system.
Figure 1B:
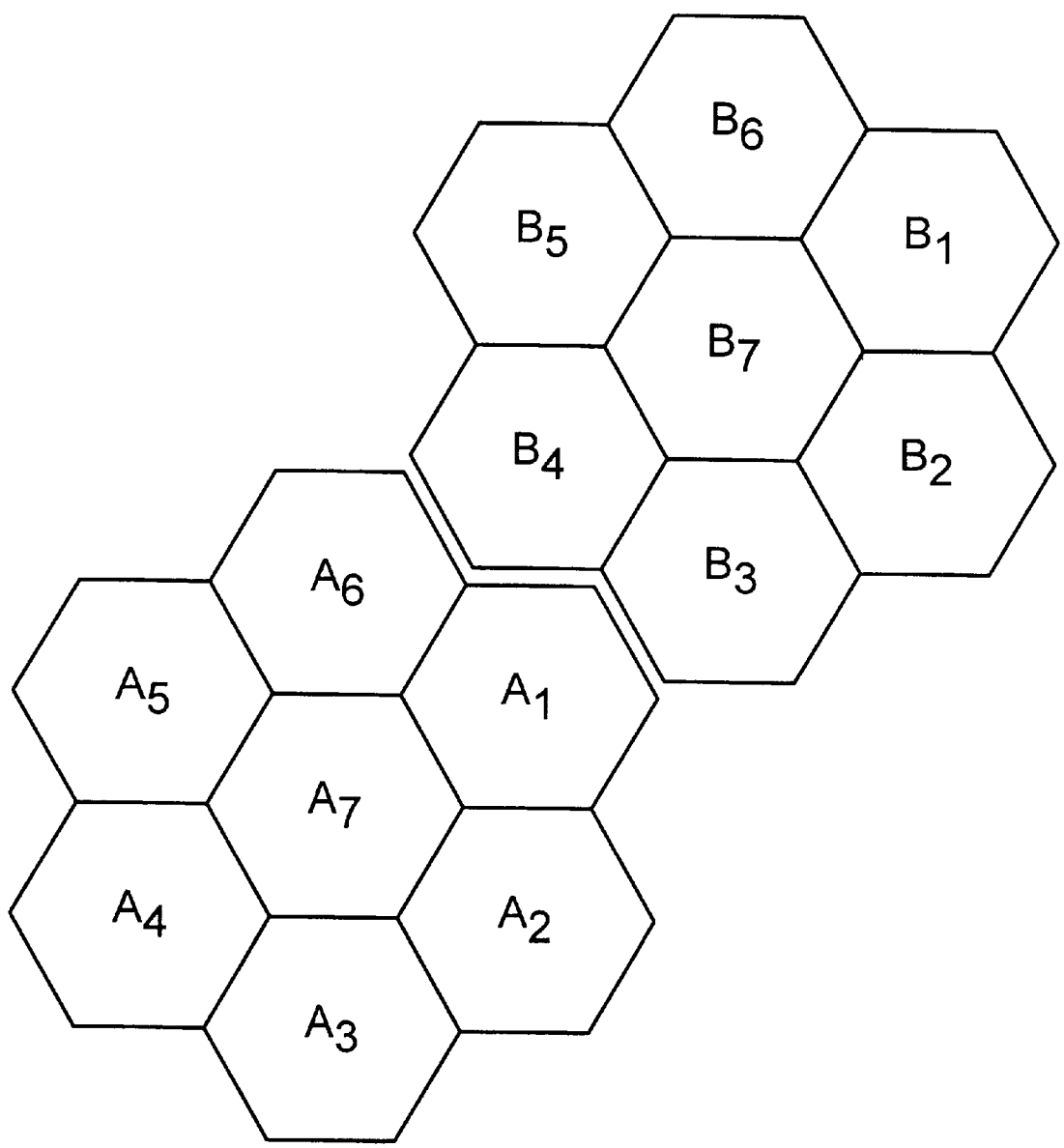

FIGS. 1A, 1B illustrate an exemplary multi-layered cellular system. An umbrella macrocell 10 represented by a hexagonal shape (see FIG. 1A) is part of an overlying cellular structure comprising many macrocells $A_1$–$A_7$, $B_1$–$B_7$ (see FIG. 1B). Each umbrella cell may contain an underlying microcell structure. The radio coverage of the umbrella cell and an underlying microcell may overlap or may be substantially non-overlapping. The umbrella cell 10 includes microcells 20 represented by the area enclosed within the dotted line and microcells 30 represented by the area enclosed within the dashed line corresponding to areas along city streets, and picocells 40, 50, and 60, which cover individual floors of a building.

Briefly, control channels are used for setting up calls, informing the base stations about location and parameters associated with mobile stations, and informing the mobile stations about location and parameters associated with the base stations. The base stations listen for call access requests by mobile stations and the mobile stations in turn listen for paging messages. Once a call access message has been received, it must be determined which cell should be responsible for the call. Generally, this is determined by the signal strength of the mobile station received at the nearby cells. Next, the assigned cell is ordered, by the mobile switching center (MSC) for example, to tune to an available voice channel which is allocated from the set of voice channels accessible to the assigned cell.

Figure 2:
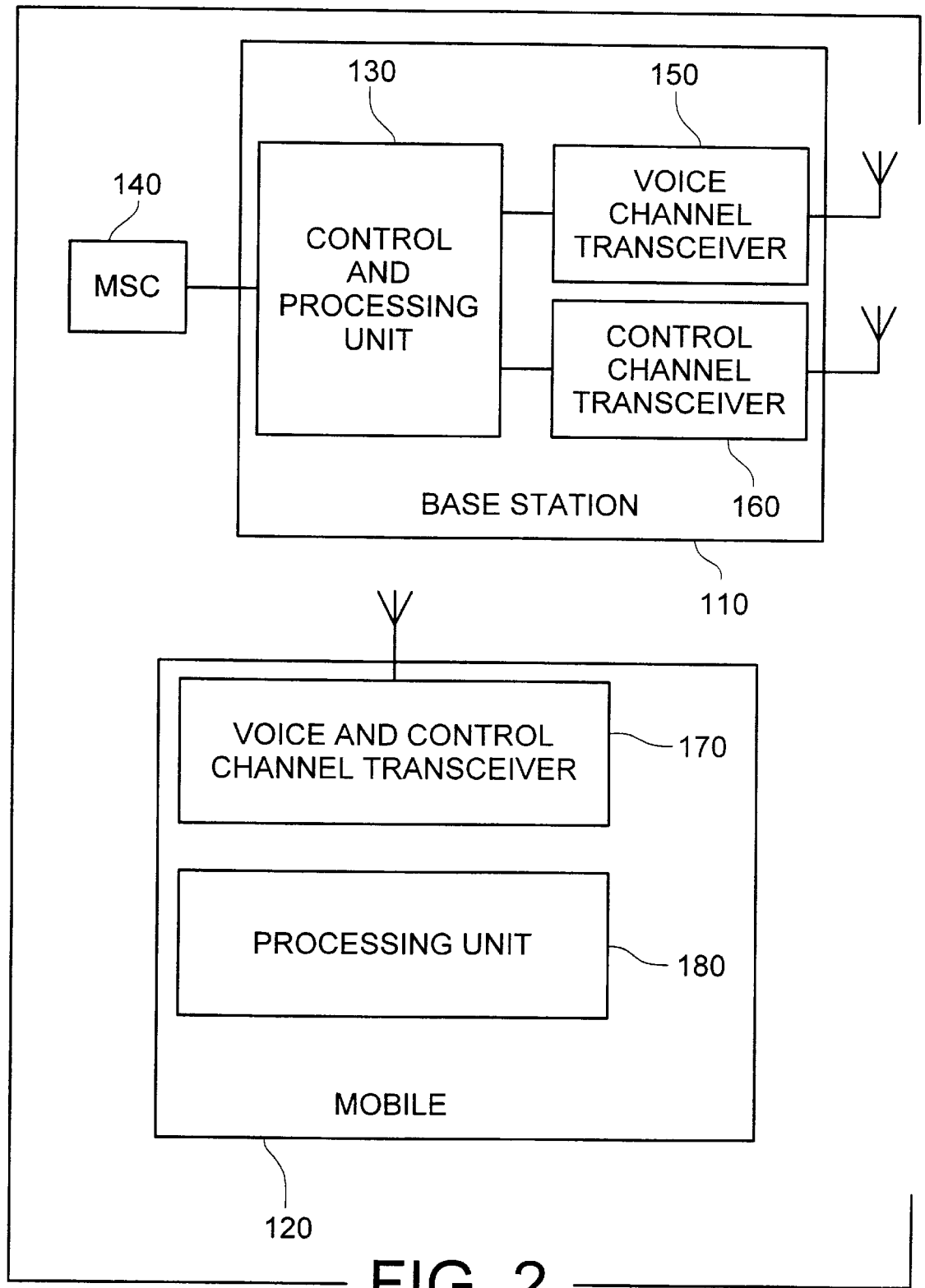
FIG. 2 is a block diagram of an exemplary cellular mobile radiotelephone system.

FIG. 2 is a block diagram of an exemplary cellular mobile radiotelephone communication system for use with the cellular structure shown in FIGS. 1A, 1B. The communication system includes a base station 110 that is associated with a respective one of the macrocell, microcell, and picocell; a mobile station 120; and an MSC 140. Each base station has a control and processing unit 130, which communicates with the MSC 140, which in turn is connected to the public switched telephone network (not shown). Each base station also includes at least one voice channel transceiver 150 and a control channel transceiver 160, which are controlled by the control and processing unit 130. The mobile station 120 includes a similar voice and control channel transceiver 170 for exchanging information with the transceivers 150, 160, and a similar control and processing unit 180 for controlling the voice and control channel transceiver 170. The mobile station's transceiver 170 can also exchange information with the transceiver 170 in another mobile station.

Having provided a general overview of an exemplary radiocommunication system in which techniques according to the present invention can be implemented, the following describes how the inherent randomness in a radio channel can be used as a substitute for pseudorandom sequence generators. Consider the n-dimensional vector space consisting of all vectors having elements that are contained in the Galois field GF(M=$2^m$), viz., all r=($r_1, r_2, \ldots, r_n$) where $r_i \epsilon$GF(M=$2^m$). (In the following, vector quantities, or sequences, are indicated by bold type and scalar quantities and functions are indicated by plain type.) For some Hamming radius t, the $M^n$ vectors r are t-sphere packed into S spheres, viz., the maximum number of disjoint spheres having radii t is S. The vectors in a sphere are mapped into a representative consisting of the center of that sphere. Let the set of S representatives be $\{c_1, c_2, \ldots, c_s\}$. Each representative vector $c_i$ has a length n and can be mapped into a binary vector k having a length mn. Let the set of corresponding binary vectors be K=$\{k_1, k_2, \ldots, k_s\}$.

If a transmitter and a receiver can establish, with high probability, a common sequence $k_i$ that is contained in the set K, then the sequence $k_i$ can be used for spreading an information sequence communicated from the transmitter to the receiver or for establishing a frequency hopping sequence to be used during the communication of the information sequence. In addition, if the probability is substantially zero that an eavesdropper can determine that common sequence $k_i$, then secure communication is also achieved—without incorporating an extra encryption and decryption algorithm to achieve cryptographic security.

The spheres constructed in accordance with Applicants' invention increase the probability of the transmitter's and receiver's establishing such a common sequence $k_i$ in the event of noise and other discrepancies in the radio channel and system hardware. In general, the transmitter establishes a sequence $r_T$ and the receiver establishes a different sequence $r_R$. If the sequences $r_T$, $r_R$ fall within the same sphere, they will be mapped into the same sequence k in the set K.

Thus, Applicants' invention provides methods and apparatus for establishing two sequences, one at a transmitter and another at a receiver, such that with high probability the two sequences fall within the same sphere. These sequences will, most frequently, exhibit pseudorandom characteristics due to the complex nature of the time-varying radio channel. Those sequences which are not pseudorandom can be detected and discarded, if necessary. Moreover, the rare event that the two sequences are not in the same sphere is quickly detectable, enabling the procedure for establishing a common sequence to be repeated. The sphere associated with an arbitrary vector is determined efficiently in real time and with low hardware complexity. A first exemplary embodiment of the present invention will now be described in the context of encryption and the establishment of key sequences used in encryption. Subsequently, more general usages of the established sequences as pseudorandom quantities will be explored.

SEQUENCE ESTABLISHMENT

Figure 3:
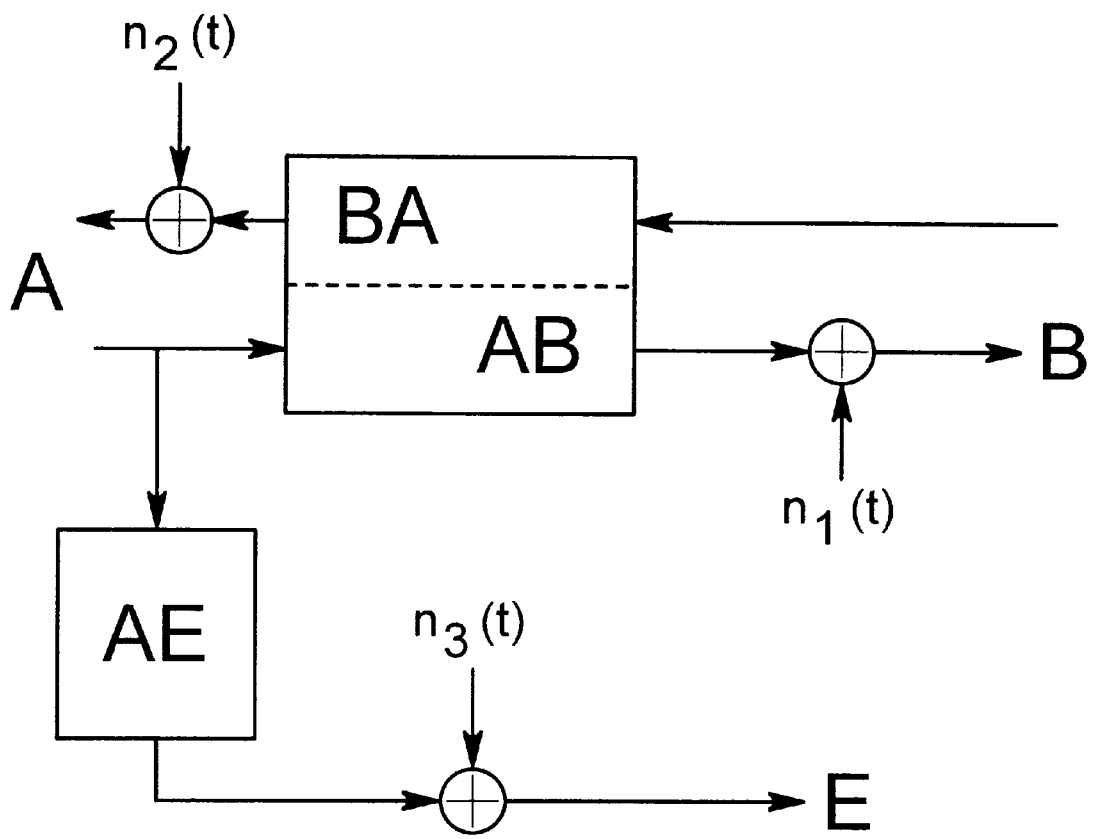
FIG. 3 is a block diagram illustrating a communication system.

A generalized communication link comprises two communication channels: a channel from a first user's transmitter to a second user's receiver, and a channel from the second user's transmitter to the first user's receiver. One can consider the link to include a third channel to an eavesdropper desiring access to the information exchanged by the first and second users. This simple scenario is depicted in FIG. 3, which shows a first user A, a second user B, and an eavesdropper E. In general, the characteristics of the AB channel, the BA channel, and the AE channel all vary with time. Thermal noise in each of the channels is represented by the additive noise terms $n_i$(t), i=1, 2, 3.

Although they vary with time, the impulse response of the A-B channel is the same as the impulse response of B-A channel excluding thermal noise, which is to say that over short periods of time, on the order of a few milliseconds, the link is reciprocal. It will be understood that the link is not reciprocal when thermal noise (and other possible nonidealities) are included.

Also, it is important to understand that the impulse responses of the A-B channel and B-A channel are different from the impulse responses of the first-user—eavesdropper A-E channel and the second-user—eavesdropper B-E channel. These differences arise because signal phase decorrelates rapidly with changing spatial position.

Two methods of establishing a sequence are described below.

COMB OF TONES

The immediately following description involves transmission of two tones at a time, but it will be appreciated that more than two tones can be transmitted at a time as described later.

Figure 4:
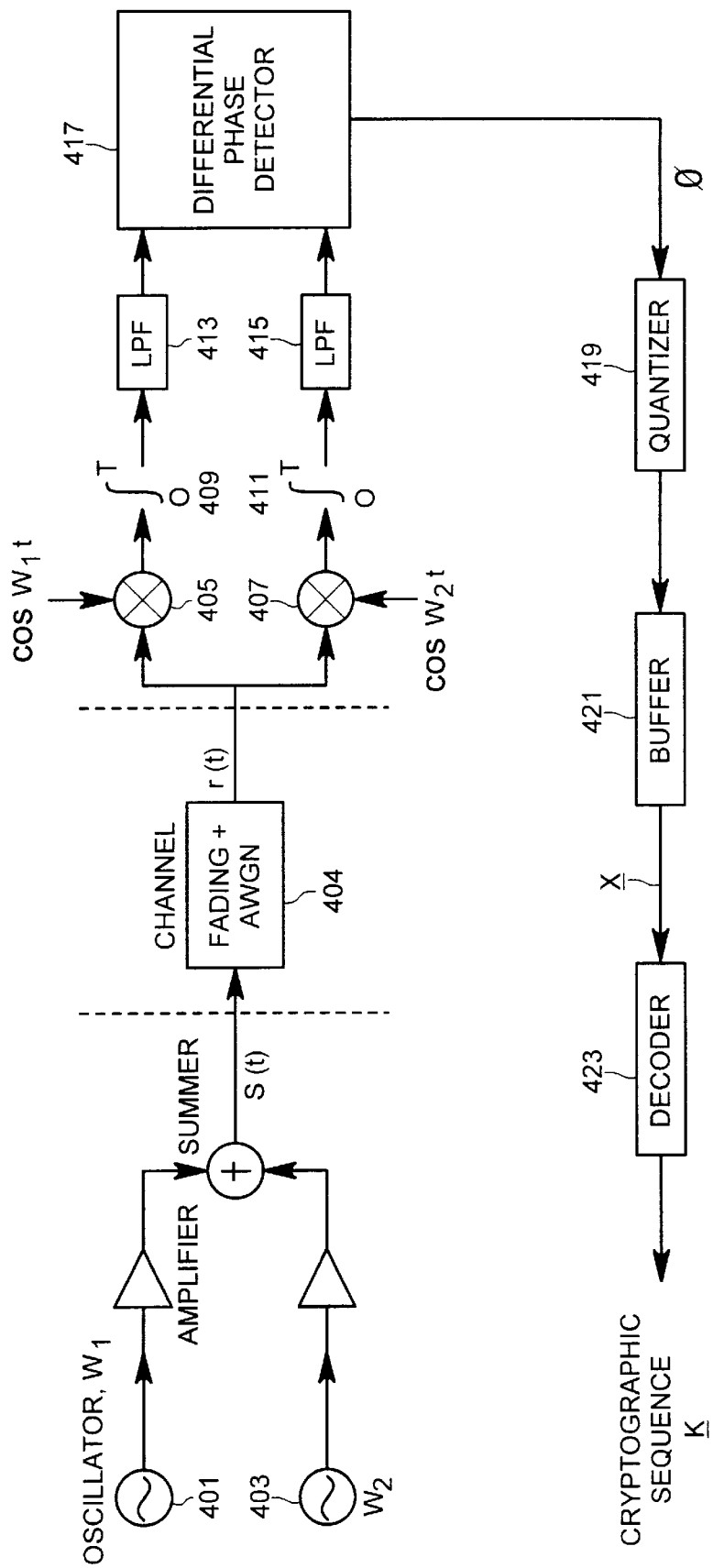
FIG. 4 is a block diagram illustrating a communication system using a comb of tones for establishing a key sequence.

Referring to FIG. 4, suppose a first transceiver (such as that used by the first user A) transmits a signal s(t) comprising two sinusoids having frequencies $f_1$ and $f_2$ and having equal initial phase offsets $\phi$ and energies E during a k-th signaling interval [kT, (k+1)T]. The transmitted signal s(t) can be generated in any of a number of ways, e.g., by amplifying and summing the output signals of two suitable oscillators 401, 403 or a frequency synthesizer, and upconverting the result to a suitable transmission frequency by modulating a carrier signal. Ignoring the modulation, the transmitted signal s(t) is given by the following expression:

$$s(t) = \sqrt{2E/T} \cos(2\pi f_1 t + \phi) + \sqrt{2E/T} \cos(2\pi f_2 t + \phi) \quad \text{Eq. 1}$$

In general, the transmitted signal s(t) is radiated by an antenna and passes through a channel such as the air, which modifies the transmitted signal by introducing time-varying fading due to multipath propagation and by adding white Gaussian noise n(t) having double-sided power spectral density $N_0/2$. The effects of the channel are pictorially referred to by block 404.

The receiver downconverts and amplifies the signal that it obtains from the channel (the downconverter and amplifier are not shown in FIG. 4), and correlates the resulting signal r(t) with its own locally generated versions of cos($2\pi f_1 t$) and cos($2\pi f_2 t$). As shown in FIG. 4, each correlation can be carried out by a suitable mixer 405, 407 and a resettable integrator 409, 411, which integrates the mixer's output signal during successive time intervals T=$\frac{1}{2}\pi f_i$, although many other devices that are known to those skilled in this art can be used. The output signals generated by the correlators are conventionally filtered by low-pass filters 413, 415 for suppressing the sum (up-converted) signals, as well as components that might be due to nearby radio signals.

Assuming the sinusoids cos($2\pi f_1 t$) and cos($2\pi f_2 t$) are orthogonal and separated by at least the coherence bandwidth of the channel, the signal r(t) received by a second transceiver such as the second user B during the k-th signaling interval is given by the following expression:

$$r(t) = \sqrt{2\Lambda_1^2(k)E/T} \cos(2\pi f_1 t + \theta_1(k)) + \sqrt{2\Lambda_2^2(k)E/T} \cos(2\pi f_2 t + \theta(k)) + n(t)$$

where the amplitude coefficients $\Lambda_i$(k), i=1, 2, are independent, identically distributed random variables.

For a channel suffering Rayleigh-distributed fading, the variables $\Lambda_i(k)$ have Rayleigh probability densities given by the following expression:

$$p_\Lambda(\lambda_i) = \begin{cases} \dfrac{\lambda_i}{\sigma^2} \exp\left(-\dfrac{\lambda_i^2}{2\sigma^2}\right), & \text{for } \lambda_i \geq 0 \\ 0, & \text{for } \lambda_i < 0 \end{cases} \qquad \text{Eq. 2}$$

where $\sigma^2 = E\{\Lambda_i^2(k)\}$ is a characteristic of the channel and $E\{.\}$ denotes expectation with respect to $p_\Lambda$. The phase terms $\theta_1(k)$ and $\theta_2(k)$ are mutually independent random variables, and each has a probability density that is uniform over the interval $[-\pi, \pi]$.

Similar expressions for the received signal r(t) can be developed for communication channels having other characteristics, such as Rician-distributed fading. For example, the probability densities for a Rician-distributed channel are given by the following expression:

$$p_\Lambda(\lambda_i) = \begin{cases} \dfrac{\lambda_i}{\sigma^2} \exp\left(-\dfrac{\lambda_i^2 + s^2}{2\sigma^2}\right) I_0\left(\dfrac{\lambda_i s}{\sigma^2}\right), & \text{for } \lambda_i \geq 0 \\ 0, & \text{for } \lambda_i < 0 \end{cases} \qquad \text{Eq. 3}$$

where $I_0(.)$ is the modified Bessel function of zero order, and $s^2$ is the power of a direct line-of-sight component.

In the transceiver of the second user B, the filtered correlator output signals are provided to a differential phase detector 417, which generates, for each time interval T, an estimate of the difference between the phase terms $\theta_1(k)$ and $\theta_2(k)$. The successive phase-difference estimates are provided to a quantizer 419, which allocates a respective one of a number of predetermined phase values to each phase-difference estimate. In accordance with Applicants' invention, it is only necessary that the phase-difference estimates for different time intervals be uncorrelated with each other. (In the following, the time index k will be dropped when it results in no ambiguity.)

Figure 5:
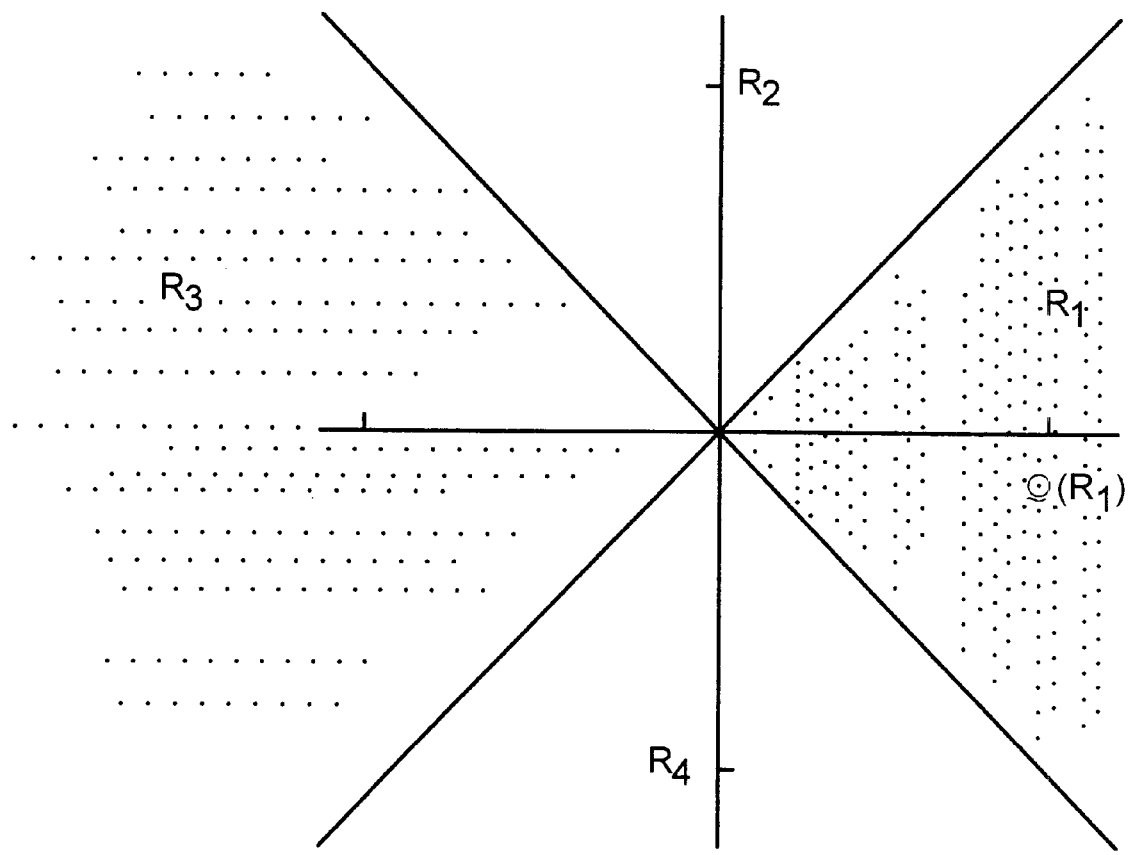
FIG. 5 shows phase-space decision regions.

The baseband differential signal generated by the differential phase detector 417 in the receiver B is given by the following expression:

$$U_B = 2\Lambda_1\Lambda_2 E \exp[j(\theta_1 - \theta_2)] + \Lambda_1 N_1 + \Lambda_2 N_2^* \qquad \text{Eq. 4}$$
$$= X_B + jY_B$$

where $N_1$ and $N_2$ are complex-valued Gaussian random variables having zero means and variances $\sigma^2 = 2EN_0$, and "*" denotes conjugation. The phase-difference estimate is given by $\Phi^B = \tan^{-1} Y_B/X_B$. As noted above, the second user B quantizes the phase-difference estimate into one of M predetermined phase values, generating a quantizer output signal $Q(\Phi^B)$. FIG. 5 illustrates phase-space decision regions for M=4. In this figure, the estimated phase $\Phi^B$, which can take any value between 0 and 360°, is quantized into four values. For example, the interval range [0,360] is divided into four regions (as shown in FIG. 5), where:

region $R_1$ is the interval $[0°, 45°] \cup [315°, 360°]$
region $R_2$ is the interval $[45°, 135°]$
region $R_3$ is the interval $[135°, 225°]$
region $R_4$ is the interval $[225°, 315°]$
If $\Phi^B \in R_1$, the quantized output $Q(\Phi^B) = 0°$.
If $\Phi^B \in R_2$, the quantized output $Q(\Phi^B) = 90°$.
If $\Phi^B \in R_3$, the quantized output $Q(\Phi^B) = 180°$.
If $\Phi^B \in R_4$, the quantized output $Q(\Phi^B) = 270°$.
Then these phases can, for instance, be mapped into information bits, $0° \to 00$, $90° \to 01$, $180° \to 11$, $270° \to 10$.

The differential phase detector or phase measuring device 417 may produce either an analog or a digital measurement of the baseband signal's instantaneous phase. A suitable differential detector is a combination of two of the phase detectors described in U.S. Pat. No. 5,084,669 to Dent and U.S. Pat. No. 5,220,275 to Holmqvist, both of which are expressly incorporated here by reference.

By repeating the above estimation-quantization process at each of times k=1, 2, ..., n, the second user B establishes a sequence of quantized phase-difference estimates that is given by the following expression:

$$r_B = [Q(\Phi_1^B), Q(\Phi_2^B), \ldots Q(\Phi_n^B)]. \qquad \text{Eq. 5}$$

This sequence $r_B$ of phase values generated by the quantizer 419 is stored in a buffer 421, such as a random-access memory, a shift register, or equivalent device, which has a length that is determined by parameters of a minimum distance, error correction decoder 423. The error correction decoder 423 in the receiver B transforms the sequence of quantized phase-difference estimates and generates an output signal that corresponds to the receiver's key sequence $k_B$. Alternatively, or in combination with the generation of a cryptographic key, as will be discussed below with respect to FIG. 8, the sequence $r_B$ of phase values can be forwarded to a randomness tester.

In effect, the size of the buffer 421 is determined by the length of the key sequence desired. If the decoder 423 has a block length N and dimensionality k, then the buffer delay is N for this example in which the comb consists of only two tones simultaneously transmitted at each of N times. As described below, more than two tones can be simultaneously transmitted, which reduces the buffer delay accordingly. For example, if T tones are simultaneously transmitted, T–1 phase differences can be quantized at once, and the buffer delay is N/(T–1).

Vector $r_B$ generated by the buffer 421 has N elements, each of which is M-ary, and thus the N-element vector is the input to any of a wide variety of minimum distance decoders 423. One useful decoder is the bounded distance decoder, which is a low-complexity decoder described in R. Blahut, *Theory and Practice of Error Control Codes*, chapt. 7, Addison-Wesley, Reading, Mass. (1983) which disclosure is expressly incorporated here by reference. The decoder 423 maps the N symbols generated by the buffer to another N symbols, which is the cryptographic key sequence $k_B$ of interest, as described in more detail below.

It will be appreciated that the signal processing operations carried out in the receiver can be performed in the digital domain by a suitable digital signal processing (DSP) device. With such a configuration, almost any type of modulation can be detected by programming the DSP device to appropriately manipulate digital samples of the received signal, as described for example in U.S. patent application No. 07/967, 027 to Dent et al. for "Multi-Mode Signal Processing", which is expressly incorporated here by reference. It will be appreciated that the DSP device may be implemented as hard-wired logic circuitry, or, preferably, as an integrated digital signal processor, such as an application-specific integrated circuit (ASIC). Of course it will be understood that an ASIC may include hard-wired logic circuitry that is optimal for performing a required function, which is an arrangement commonly selected when speed or another performance parameter is more important than the versatility of a programmable digital signal processor.

In a manner and with hardware similar to that described above, the first user A establishes its own sequence of quantized phase-difference estimates from a signal transmitted by the second user B. With a delay after transmission by the first user that is negligible, i.e., a delay that is small in comparison to the channel's coherence bandwidth, the second user B transmits a signal comprising the two sinusoids having the frequencies $f_1$ and $f_2$ and equal phase offsets and energies. In other words, the first user A transmits, then the second user B, then the first user A, and so on in an interleaved manner in order to maintain the reciprocity assumption.

Suppose the first user A is a radiotelephone moving at a speed of 100 km/hr with respect to a base station or other transceiver (the second user B) and using a radio frequency carrier in the 900 MHz region. If the delay between the transmissions by the first user and the transmissions by the second user is 10 $\mu$sec, the radiotelephone would move only 0.28 mm during each delay, a distance that is negligible in comparison to the wavelength of 0.3 m. Thus, the scatterings of the signal from the various reflectors should be strongly correlated. Also, a 10-$\mu$sec delay is longer than the time usually needed to permit all signal rays due to multipath propagation to arrive at the second user and shorter than the few milliseconds needed to ensure the reciprocity of the channel. If the motion is slower or the delay is shorter, the reciprocity of the channel is even more precise.

Thus, the first user A forms a baseband differential signal (the output of its own differential phase detector) given by the following expression:

$$U_A = 2\Lambda_1\Lambda_2 E \exp[j(\theta_1 - \theta_2)] + \Lambda_1 V_1 + \Lambda_2 V_2^* \quad \text{Eq. 6}$$

$$= X_A + jY_A$$

where $V_1$ and $V_2$ are independent of $N_1$ and $N_2$. The estimated phase difference generated by the first user A is $\Phi^A = \tan^{-1} Y_A/X_A$. It will be observed that, due to the reciprocity of the channel, the only difference between $U_A$ and $U_B$ is the additive Gaussian noises.

By successively repeating the estimation-quantization process, the first user A establishes a sequence of phase-difference estimates that is given by the following expression:

$$r_A[Q(\Phi_1^A), Q(\Phi_2^A), \ldots, Q(\Phi_n^A)]. \quad \text{Eq. 7}$$

which is the sequence stored in a buffer 421 in the first user's transceiver and provided to a corresponding error correction decoder in that first transceiver.

From these transmitted signals, the eavesdropper E can obtain a baseband differential signal given by the following expression:

$$U_E = 2\Lambda_3\Lambda_4 E \exp[j(\theta_3 - \theta_4)] + \Lambda_3 V_3 + \Lambda_4 V_4^* \quad \text{Eq. 8}$$

$$= X_E + jY_E$$

where the $\Lambda_i$, i=1, 2, 3, 4, are mutually independent. The eavesdropper's estimated phase difference is $\Phi_E = \tan^{-1} Y_E/X_E$. Also, the $\theta_i$, i=1, 2, 3, 4, are mutually independent random variables. The eavesdropper E can establish a sequence of phase-difference estimates given by the following expression:

$$r_E = [Q(\Phi_1^E), Q(\Phi_2^E), \ldots, Q(\Phi_N^E)]. \quad \text{Eq. 9}$$

As noted above, each of the three sequences or vectors $r_A$, $r_B$, and $r_E$ that are established is an input signal to a respective error correction decoder. The output signals generated by the decoders correspond to the key sequences $k_A$, $k_B$, $k_E$. It will be noted that no encrypting need be performed at the transmitters A, B. The decoders limit the number of possible keys to increase the probability of the first user's and second user's establishing the same key as described in more detail below.

To explain why the tones $f_1$, $f_2$ must have frequencies that are sufficiently separated so that their phases are independent, let $$\psi \Delta (\theta_1-\theta_2)-(\theta_3-\theta_4). \quad \text{Eq. 10}$$

and define $$g(x) = \frac{1-\alpha^2}{4\pi^2}\sqrt{1-\alpha^2\cos^2 x} + \frac{\alpha\cos x\cos^{-1}(-\alpha\cos x)}{(1-\alpha^2\cos^2 x)^{3/2}} \quad \text{Eq. 11}$$

where $\alpha^2 = J_0^2(\omega_D\tau)/[1+(\omega_1-\omega_2)^2\sigma^2]$; $J_0$ is the Bessel function of order 0; $\omega_D$ is the Doppler frequency shift due to relative motion between the transmitter and receiver; $\tau$ is the transmission time delay; and $\sigma$ is a time delay spread between the multipath signal rays. Then, as explained in W. C. Jakes, Jr., ed., *Microwave Mobile Communications* chapt. 1, John Wiley and Sons (1974), $\Psi$ is a random variable having a probability density function given by the following expression:

$$p_\Psi(\psi) = 4\pi^2 \int_0^\pi g(x)[g(x+\psi)+g(x-\psi)]dx \quad \text{Eq. 12}$$

Figure 6:
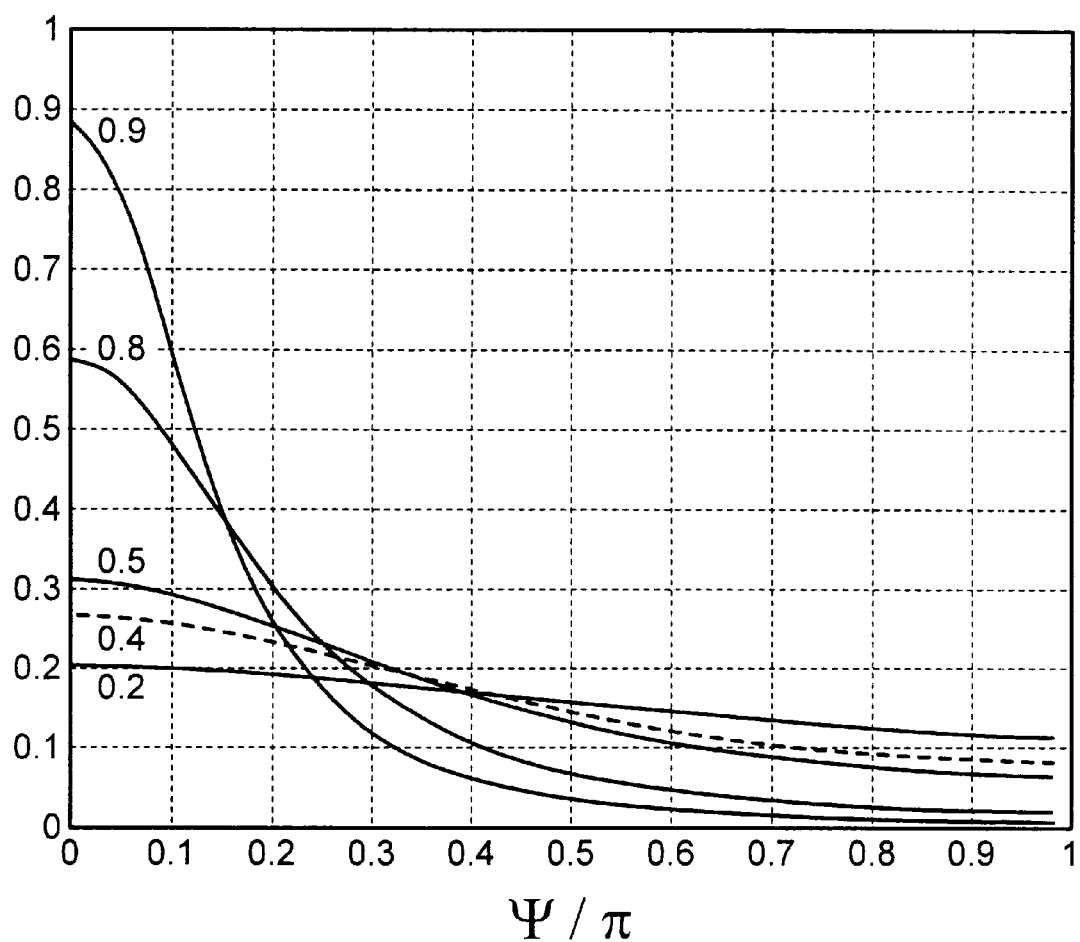
FIG. 6 shows probability density functions of the random variable ψ.

FIG. 6 shows the probability density function $p_\psi$ as a function of $\psi/\pi$ for five different values of the parameter $\alpha^2$. For a frequency separation ($\omega_1-\omega_2$) of 40 KHz and a time delay spread or of 5 $\mu$sec (i.e., $\alpha^2 < 0.4$, even for the worst case that $\omega_D\tau=0$), the random variable $\psi$ is almost uniformly distributed. In this case, the quantizers quantize the phase-difference estimates into each of the M phase values with equal probability 1/M. The security of the system depends on the degree to which the phases of the tones are decorrelated by passage through the communication channel. If the decorrelation is substantially complete, then the amount of work an eavesdropper must do to break the system approaches that of an exhaustive search for the key sequences $k_A$, $k_B$.

It will be appreciated that the preceding analysis was simplified by letting the two tones have equal energies and equal initial phase offsets, which are easy to obtain with a phase-locked loop for example. In general, it is only necessary for these parameters to be predetermined, viz., known a priori to both transceivers, but such a system is more complicated than that described above.

Also, the preceding analysis considered only two tones transmitted at any one time, but in general, the comb could consist of more than two simultaneously transmitted tones and the preceding analysis would apply to successive pairs of such a comb of tones. In fact, the sequences $r_A$, $r_B$ could be generated all at once by simultaneously transmitting a comb of the appropriate number of tones, and estimating and quantizing the phase difference of each successive pair of tones. Simultaneous transmission of the two or more tones is desirable because it is easy then to control the initial phases of the tones, leading to a less complicated system.

Moreover, it is not necessary that the frequency separation between the tones in one pair of tones be the same as the frequency separation between another pair; in other words, the "comb" can have unevenly spaced "teeth". Also, it is not necessary to consider only pairs of successive tones; in other words, the "teeth" in a pair can be separated by other "teeth". For example, if the comb includes ten tones $f_1, f_2, \ldots f_{10}$ arranged in order of increasing frequency, the necessary uniform distribution of the random variable $\psi$ (see Eq. 12) could be obtained by pairing, say, the tones $f_1$ and $f_4$; $f_2$ and $f_5$; $f_3$ and $f_6$; etc. It is only necessary for the tones in each pair to be orthogonally spaced, i.e., the frequency separations must be sufficient as described above.

PILOT SYMBOLS

Instead of transmitting a comb of sinusoids as described above, the sequences $k_A$, $k_B$ can be established based on only a plurality of pilot symbols such as the bits that may be transmitted for synchronizing the operation of a first transceiver and a second transceiver. Such sync bits are typically included in dedicated synchronization fields of messages transmitted in conventional cellular radiotelephone systems as is well known to those skilled in the art. Two ways of establishing the sequences based on the pilot symbols are described below.

A sequence k can be crudely established by hard-decision decoding the pilot symbols and mapping the resulting sequence of decoded pilot symbols to the center of a sphere. It is believed that any errors in the sequence decoded by the first user will be the same as errors in the sequence decoded by the second user. Thus, the two pilot symbol sequences will be mapped to the same sphere and yield the same key. Even if the errors in the sequences decoded by the first and second users are slightly different, the two sequences will still be mapped to the same sphere with high probability, yielding the same key. A possible shortcoming of this method is that many pilot symbols are needed to make it computationally difficult for an eavesdropper to exhaust all possibilities. If the pilot symbols are the sync bits in a cellular radio telephone system, it is currently believed that at least sixty bits are needed.

It will be appreciated that the necessary pilot symbols need not be transmitted together, viz., it is not necessary to use all of the sync bits in one frame of a CDMA channel or one time slot of a TDMA channel. For example, any one or more of the sync bits in one frame can be used with any one or more of the sync bits in other frames. It is only necessary that the frames be separated by a time interval that is longer than the coherence time of the channel as described above.

A more refined method of establishing a sequence based on the pilot symbols uses channel state information rather than hard-decision decoding. In this method, the first and second users interpolate known pilot symbols and quantize the outputs of the interpolators in a manner similar to that described above with respect to the method of establishing the sequence based on a comb of tones.

For example, after downconverting, amplifying, and filtering the received signal as necessary, the second user determines a phase estimate for each of the bits in the sync portion of a CDMA frame. Of course, the first and second users could agree to use another set of known bits. The second user determines the differences between each of the phase estimates and the respective predetermined phases for the known bits. These phase-difference estimates are then quantized and provided to a minimum distance decoder as described above in connection with sequence establishment by transmitting a comb of tones or to a randomness tester in connection with spreading sequence or frequency hopping sequence generation as described below.

Figure 7:
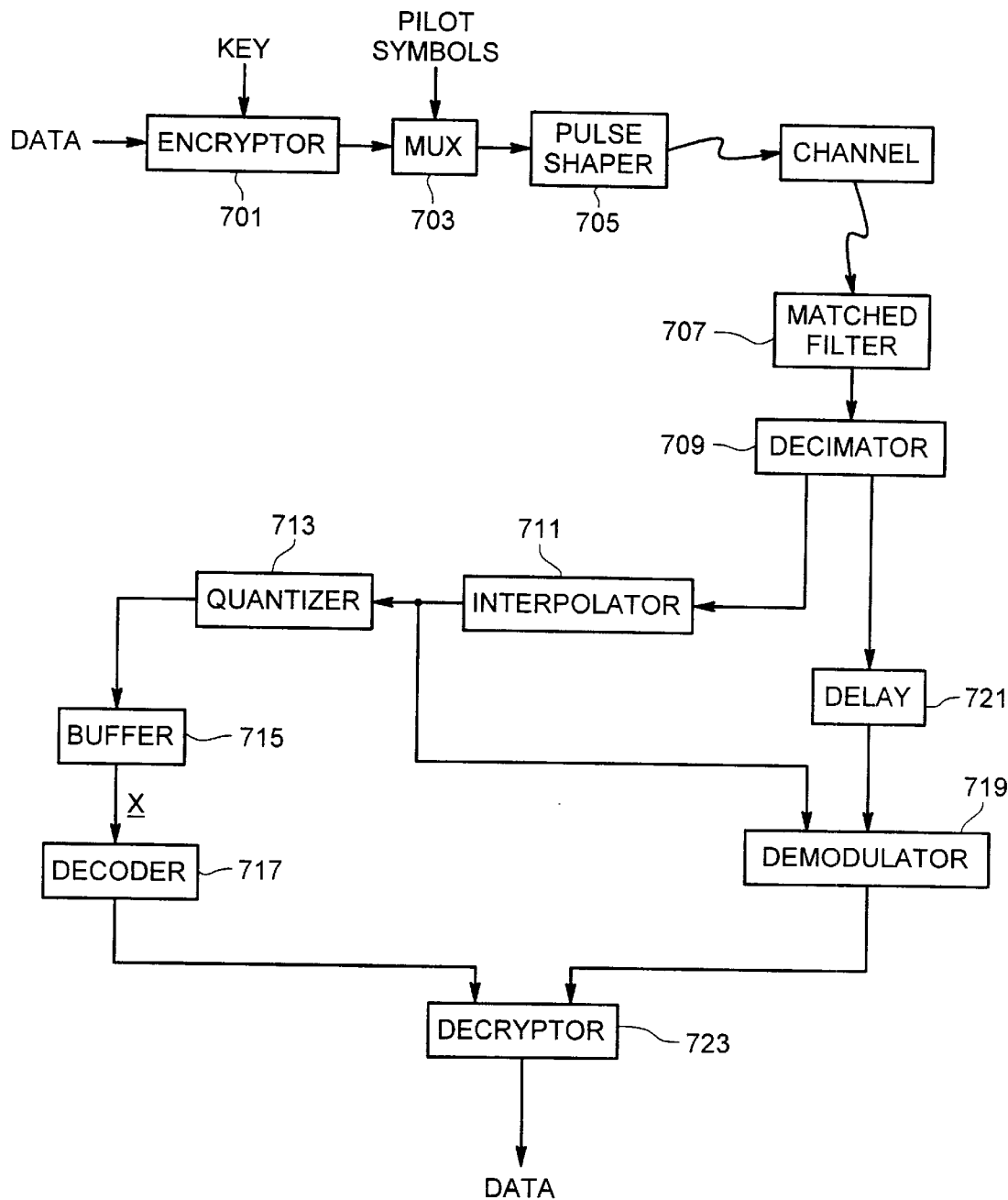
FIG. 7 is a block diagram of a communication system using pilot symbols for establishing a key sequence.

FIG. 7 is a block diagram of a system for carrying out this "refined method" of using pilot symbols. In a first transceiver, data to be transmitted is encrypted according to a key sequence by an encryptor 701. Of course, before the key sequence has been established, the encryptor would simply pass the data to be transmitted without alteration. A multiplexer 703 combines the encrypted data to be transmitted with the known pilot symbols, which may be bits used for synchronization and overhead signaling in conventional radiotelephony. It is only necessary for the pilot symbols to be transmitted with known phases. The sequence of interleaved data and pilot symbols formed by the multiplexer 703 is provided to a pulse shaper and up-converter 705 for transmitting the information through the communication channel, which in general is characterized by fading and additive white gaussian noise.

At the receiving second transceiver, the signal received from the channel is down-converted as necessary and passed through a matched filter 707. The signal generated by the matched filter 707 is divided by a suitably controlled switch 709, or decimator, into a signal comprising the received data that was transmitted and a signal comprising the received pilot symbols. An interpolator 711 measures the phases of the received pilot symbols and forms the difference between each measured phase, which generally will have been rotated by channel fading, and the known transmitted phase of the respective pilot symbol. The interpolator 711 preferably low-pass filters these phase-difference estimates. The phase difference values generated by the interpolator 711 are quantized by a quantizer 713, and stored in a buffer memory 715 for accumulating enough phase difference values. The sequence of phase difference values is then decoded by a decoder 717 for generating a key sequence as described above in relation to FIG. 4.

The phase difference values generated by the interpolator 711 are also provided to a demodulator 719 such as an error correction decoder for recovering the data that was transmitted. The demodulator 719 also receives the data that was transmitted, which may have passed through a delay device 721 suitable for synchronizing the phase difference values and the data that was transmitted. Assuming that received data was encrypted according to the key sequence before transmission, the encrypted transmitted data produced by the demodulator 719 and the key sequence produced by the decoder 717 are provided to a decryptor 723 for recovering the data transmitted.

In a manner and with hardware similar to that described above, the transmitter establishes its own key sequence based on transmissions from the receiver, and that key sequence can be used to decrypt encrypted transmissions from the receiver.

SPHERE PACKING AND ASSOCIATION

Assuming that K is given and the spheres are predetermined, the general problem of mapping an arbitrary sequence to a sphere is NP-hard, viz., the computational complexity of the problem is proportional to the number of possible spheres. For this application of secure transmission and spreading, the number of spheres is prohibitively large. Nevertheless, imposing a simplifying structure on the candidate sequences k (corresponding to the representatives c of the spheres) serves to reduce the computational complexity to an acceptable level.

In accordance with Applicants' invention, the set of candidate sequences is limited to the set of sequences of a linear block error correcting code. The radii of the spheres are then determined by such a code's error correcting capability, i.e., the number of errors that the code can correct, and the received sequences r can be mapped to the candidate sequences k by an appropriate known decoding procedure.

As one specific example, linear Bose-Chaudhuri-Hocquenghem (BCH) codes can be used as the set of candidate sequences k; such codes can be decoded with low complexity using either the Peterson-Gorenstein-Zierler procedure or the Berlekamp-Massey procedure, or any procedure for decoding cyclic codes, as described in the above-cited book by R. Blahut. If the code parameters are (n, k) with minimum Hamming distance d and with code symbol alphabet GF($2^m$), candidate sequences of length mn can be established from a set of size $2^{mn}$. The Hamming radius t of the sphere, or equivalently the error correcting capability of the code, is given by $t \leq [(d-1)/2]$. (The spheres need not be closely packed).

The received sequences $r_A$, $r_B$, and $r_E$ having suitable randomness properties are the inputs to error correction decoders implementing the Berlekamp-Massey procedure. The outputs of the decoders are the sequences $k_A$, $k_B$, and $k_E$. Again, it will be noted that no encrypting need be performed by the transmitters. The decoders substantially limit the number of possible sequences, thereby increasing the likelihood of sequence agreement between the first and second users. It may be noted that decoders might not be needed at very high signal-to-noise ratios (SNRs), although such very high SNRs would be difficult to obtain in a practical communication system.

RANDOMNESS TESTING

The previous exemplary embodiments explain how the inherent randomness of certain radio channel characteristics can be capitalized upon to derive key sequences without using conventional pseudorandom quantity generation and without the need to exchange the pseudorandom quantity over the air interface. However, Applicants have also recognized additional applications for these techniques, including, for example, the determination of pseudorandom frequency hop sequences and spreading sequences.

Because of the randomness of the communication channel, the sequences r stored in the buffers 421 or 715 are random. Those sequences would be ideal in a basic communication system that used direct-sequence spread spectrum or frequency-hopped spread spectrum techniques. Moreover, different users could agree to use different sequences in a multiple-user spread spectrum communication system.

On the other hand, in many cases the sequences r stored in the buffers will include strings of consecutive binary ZEROES or ONES. Such sequences are not suitable use as signal processing techniques where highly random quantities are needed, e.g., for use as spreading sequences in a CDMA system because their cross-correlation properties are undesirable. Accordingly, the sequences stored in the buffers 421 or 715 are provided as input signals to a randomness tester to ensure that the spectra of the sequences have the proper shapes.

Figure 8:
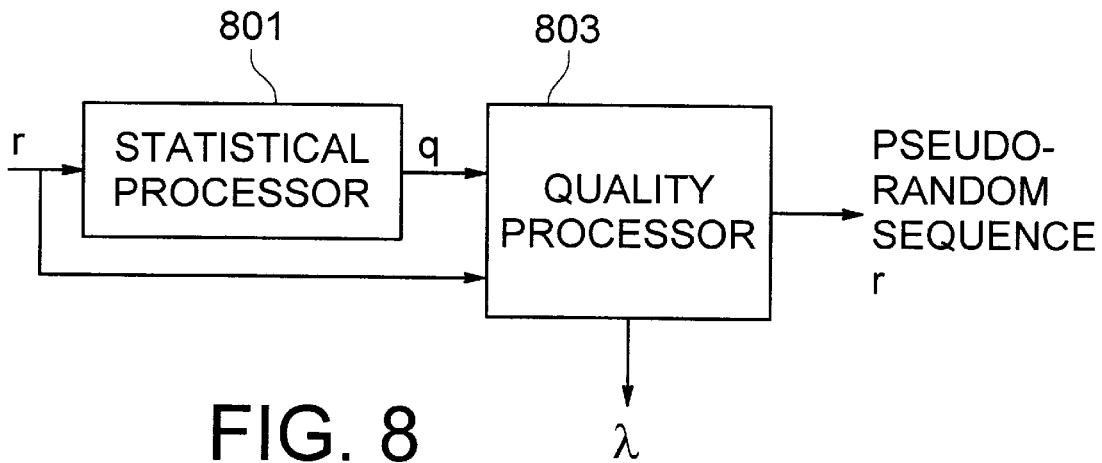
FIG. 8 is block diagram of an exemplary randomness tester.

FIG. 8 is block diagram of a suitable randomness tester, comprising a statistical processor 801 and a quality processor 803. The statistical processor 801 tests the randomness of a sequence r and generates an output signal q that represents the quality of randomness. The quality processor 803 is in essence a switch controlled by a comparator that receives the signal q and the respective sequence r and determines whether the value of q is acceptable, i.e., whether q passes a predetermined quality threshold λ, e.g., whether $q \geq \lambda$. If so, the respective sequence r is used as a spreading sequence in a direct-spreading system or as a control signal for a frequency synthesizer in a frequency-hopping system as will be described below. If the value of q is unacceptable, e.g., if $q \leq \lambda$, the respective sequence r is not used, and the sequence may be erased from the buffer.

In general, the values of q that are acceptable, which is to say the value of the threshold λ applied to the quality processor 803, depend on the conditions of the channel and the particular application. For example, a lower value of q is acceptable when the users have information that the channel is not heavily loaded. Consider a spread spectrum channel currently being used to support only one connection. For a second user attempting to access this channel, a relatively low q value may be acceptable for the sequence r, because the mutual interference caused by only one additional connection is expected to be relatively low. To generalize, in low traffic situations, the mutual interference of the relatively few users can be acceptable even if those users are not using spreading sequences having ideal cross-correlation properties, thus permitting a lower threshold λ.

The statistical processor 801 is preferably implemented by a suitably programmed microprocessor for quickly carrying out t-tests for whiteness of the spectra of the sequences r and Kurtosis tests for gaussianicity. One of the reasons for testing a sequence r, comprising elements r(1), r(2), r(3), ... r(N), is to determine whether it is reasonable to assume that the sequence was produced by a white, gaussian source, which is ideal. Also, it is desirable to remove any d.c. bias in the sequence (normalize to a mean value of zero).

The first step carried out by the statistical processor 801 is removing the d.c. bias by determining the sequence's mean value $\bar{r}$ according to the following expression:

$$\bar{r} = \frac{1}{N}\sum_{i=1}^{N} r(i)$$

and then subtracting $\bar{r}$ from each sequence element to yield a normalized sequence r.

Next, a correlation test is carried out on the normalized sequence, the correlation test comprising the steps of determining the variance $\sigma^2$ from the expression:

$$\sigma^2 = \frac{1}{N}\sum_{i=1}^{N} r^2(i)$$

and determining the parameter $\hat{\rho}$ from the expression:

$$\hat{\rho} = \frac{\sum_{i=1}^{N-1} r(i)r(i+1)}{(N-1)\sigma^2}$$

At this point, a threshold for the t-test can be selected and a check is made whether the assumption that $\rho=0$ is supported. If not, the sequence r is discarded. The t-test is well known in the literature, and is described for example in A. Held, *Statistical Theory with Engineering Applications*, p. 609, Wiley Inter-Science (1952) which disclosure is expressly incorporated here by reference.

As a third step, the statistical processor 901 carries out a Kurtosis test by determining a parameter $\beta^2$ from the expression:

$$\beta^2 = \frac{\sum_{i=1}^{N} r^4(i)}{\sigma^4}$$

Thresholds for the Kurtosis test are selected in the usual way, and a check is made to determine whether the parameter $\beta^2$ is acceptable. If the Kurtosis test fails, the sequence r is discarded. Different thresholds can be set for different values of N, of the probability of exceeding, etc., as described for example in E. S. Pearson, "A Further Development of Tests for Normality", *Biometrika* vol. XXII, pp. 239–249 (July 1930). These different thresholds affect the performance of the CDMA system in the following way. For large values of λ, the system will ensure good sequence generation and thus many users can simultaneously access the channel with limited mutual interference. However, the system will incur more delay for larger values of λ, because the randomness test may reject many sequences before arriving at a sequence which exceeds the threshold. For smaller values of λ, fewer users can be accommodated, but sequence establishment is faster.

It will be appreciated that the t-test and Kurtosis test described above are "computationally benign", which is to say that they require only a small number of simple arithmetic computations. As a result, these tests can be performed in parallel on several candidate sequences by readily available and inexpensive microprocessors.

FREQUENCY HOPPING

Figure 9A:
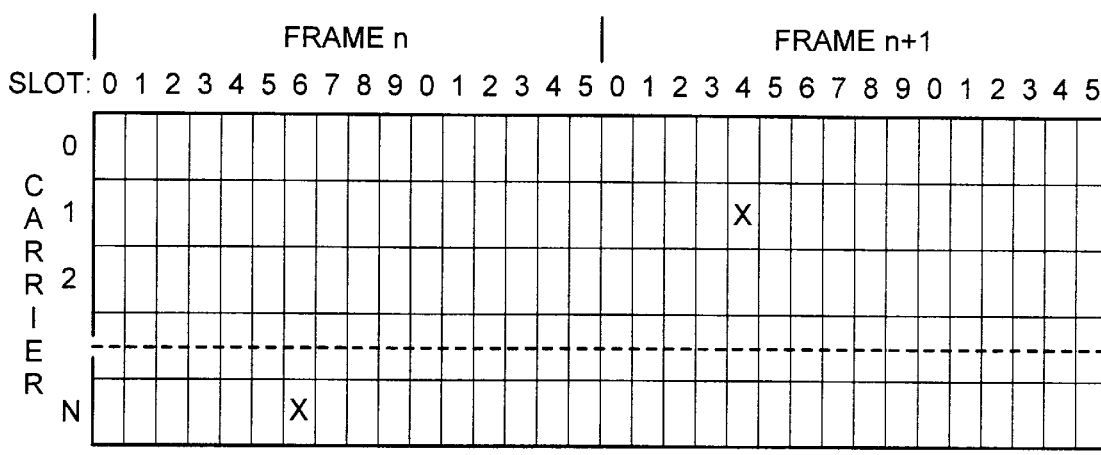
FIG. 9A is a matrix used to illustrate time slot and frequency hopping generally.

FIG. 9A illustrates both time slot and frequency hopping in an exemplary communication system. Those skilled in the art will appreciate that the techniques described herein are equally applicable, however to time slot hopping or frequency hopping alone rather than in combination as described here. In FIG. 9A, each traffic channel consists of one time slot on one carrier in each frame. For a particular channel (i.e., the combination of time slot and carrier frequency), both the time slot and carrier frequency change from frame to frame. The sequence of slots/carriers used for a particular channel is called the hop sequence, and a hop sequence used in a given cell can be orthogonal to other hop sequences used in that cell but not orthogonal to hop sequences used in other cells as described previously.

Figure 9B:
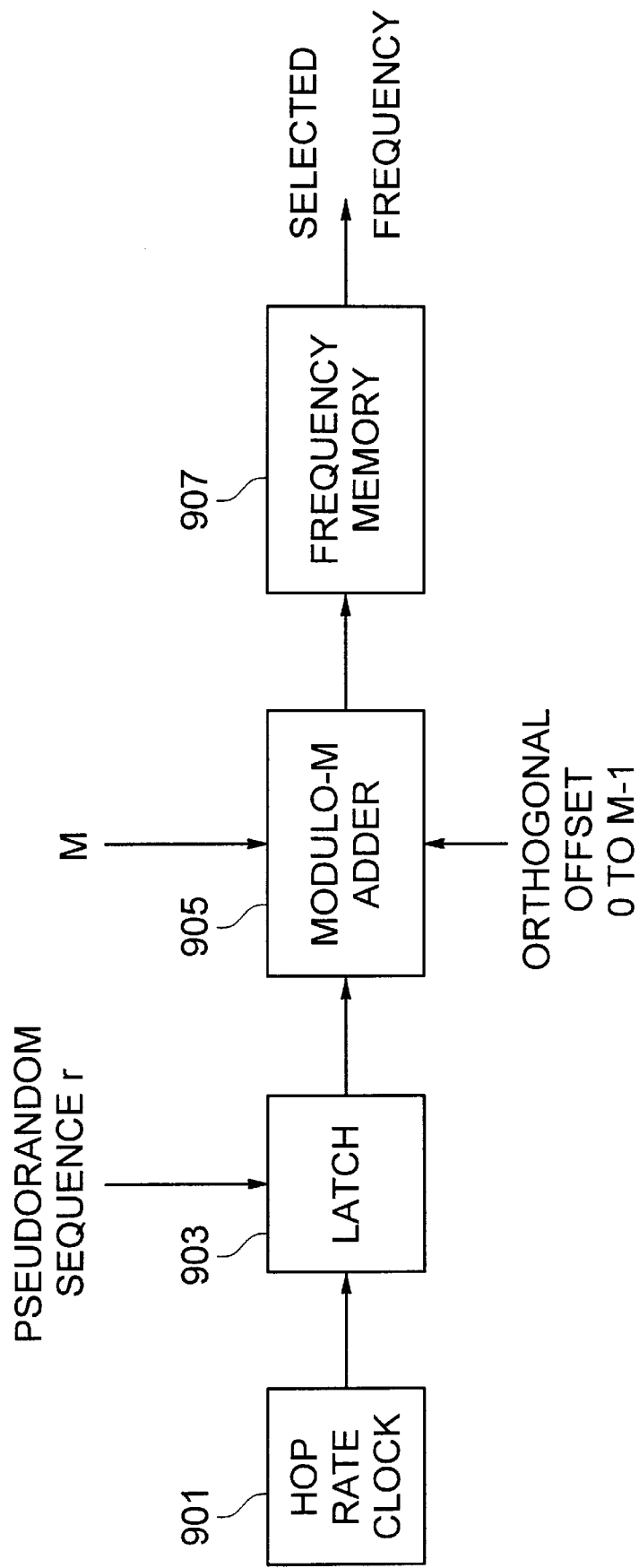
FIG. 9B is a block diagram of an exemplary hop sequence generator according to the present invention.

In FIG. 9A a matrix of time slots/carriers for two such TDMA frames is shown. In the frame n, a certain channel consists of one burst on carrier frequency N in time slot 6, as shown by the square marked 'X' in the matrix. In the next frame n+1, the same channel uses another carrier frequency and time slot as denoted by the square marked 'X' according to the pseudo-random hop sequence. An exemplary system for determining this hop sequence will now be described with reference to FIG. 9B.

Therein, a hop rate clock 901 provides a clock pulse which is selectively timed for each desired change in time slot and carrier frequency. This clock pulse is used to trigger latch 903 so that the pseudorandom sequence r stored therein is output. At the same time, a new pseudorandom quantity which has been determined as described above with respect to sequence establishment and evaluated as described above with respect to FIG. 8 to ensure that it has suitable randomness, is latched into device 903. The output pseudorandom sequence is input to modulo-M adder 905, which can optionally be provided to orthogonalize the pseudorandom quantity received from latch 903. Adder 905 operates modulo the number of frequencies M in the frequency memory 907. The pseudorandom quantity and the orthogonal offsets can also be constrained to the range zero to M−1 so that the output of the modulo M adder 905 does not exceed the range of addresses provided in frequency memory 907. Thus, once the address is provided to frequency memory 907, a corresponding frequency stored therein will be output as the selected frequency for either the mobile station or the base station to tune its respective receiver or transmitter. Thus, a pseudorandom number generator which typically would be found instead of latch 903 has been replaced with a much less complicated element.

SPREADING SEQUENCES

Figure 10:
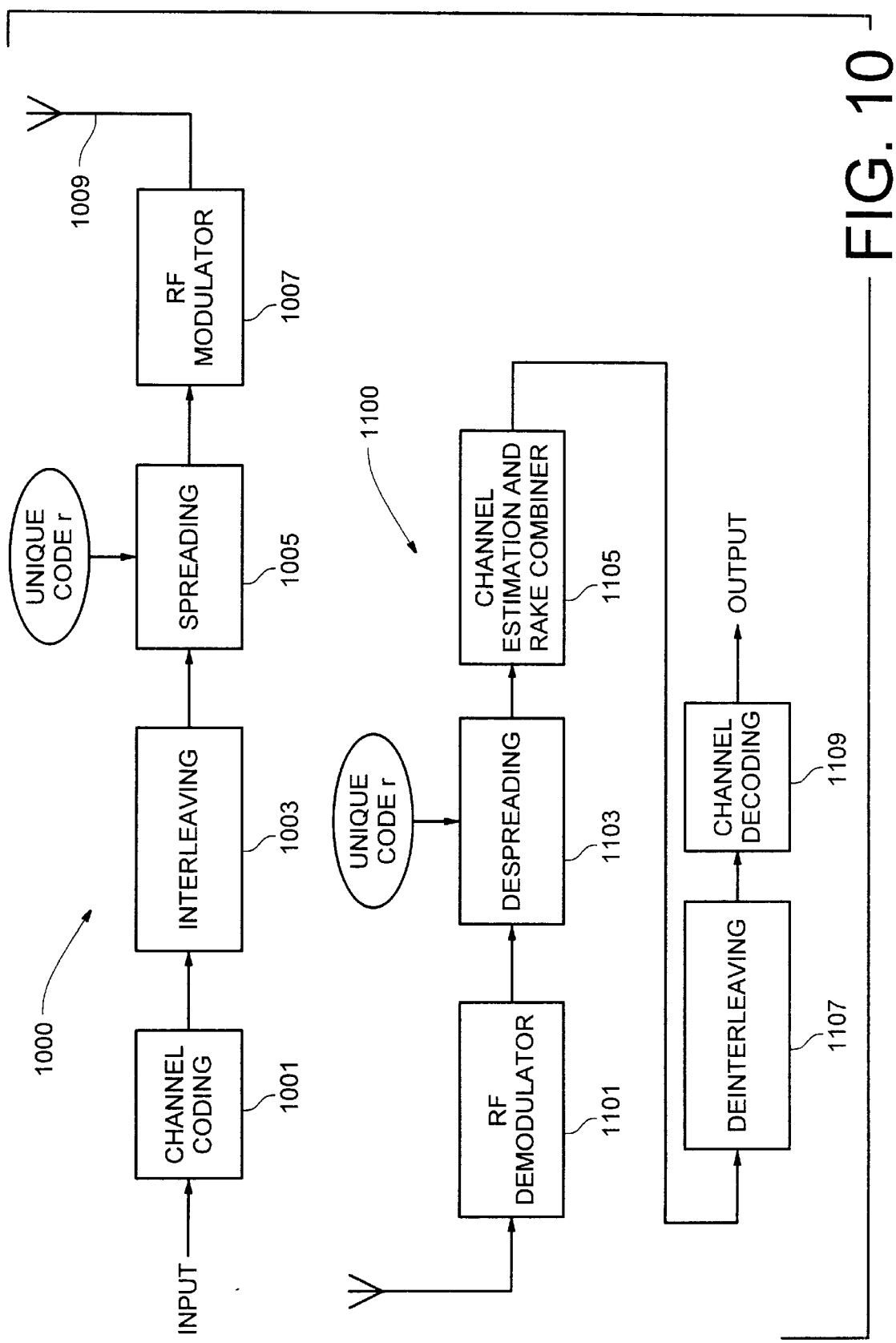
FIG. 10 is a block diagram which generally illustrates the elements of a CDMA transmitter and receiver according to an exemplary embodiment of the present invention.

FIG. 10 illustrates an exemplary transmitter 1000 and receiver 1100 which can be used to provide CDMA transmissions and receptions according to the present invention. At the transmitter, an input data signal would be provided at channel coding block 1001 where the data is coded with an error correcting code. At block 1003, the resulting sequence of symbols is interleaved and, at block 1005, the signal is spread using the pseudorandom sequence provided by the randomness tester of FIG. 8 and which is identified in FIG. 10 as unique code r. As described previously, the spreading code in this exemplary embodiment is determined by testing the radio channel characteristics as described above. The resulting signal is then used to modulate an RF carrier at block 1007 and transmitted via antenna 1009.

The receiver, indicated generally at 1100, then demodulates the signal at block 1101 and despreads the signal at block 1103 using the same unique spreading code as that which was used in block 1005 to spread the transmitted signal. Again, the receiver will determine the unique spreading code by testing the radio channel in the aforedescribed manner. The sequence determined thusly will then be provided to a randomness tester such as that illustrated in FIG. 8, before being provided as unique spreading code r. Among other functions, the channel estimator and rate combiner which are represented by block 1105 combine the resulting signal with echos or pre-echos of the same signal. The reverse functions of blocks 1003 and 1001 are performed in the deinterleaver 1107 and channel decoding block 1109, respectively.

PERFORMANCE ANALYSIS

To assess the performance of Applicants' sequence agreement system, it is helpful to assume the following events:

$G_i = \{\theta_A \in R_i, \theta_B \in R_i\}$, $B_i = \{\theta_A \in R_i, \theta_E \in R_i\}$.

The probability of a symbol match between the first and second users is given by the following expression:

$$P_g = Pr\left\{\bigcup_{i=1}^{M} Pr(G_i)\right\} = \sum_{i=1}^{M} [Pr(\theta_A \in R_i)]^2 \qquad \text{Eq. 13}$$

The probability of a symbol match between the first user and an eavesdropper is given by the following expression:

$$P_b = Pr\left\{\bigcup_{i=1}^{M} Pr(B_i)\right\} = \frac{1}{M} \qquad \text{Eq. 14}$$

The probability density function of an estimated phase θ in a decision region can be derived as follows. Initially, assume $\Delta = \theta_1 - \theta_2$ is given and equal to zero. Consider the following:

where, conditioned on $\Lambda_1$ and $\Lambda_2$, $E\{X\} = 2\Lambda_1\Lambda_2 E \triangleq \mu$; $E(Y) = 0$, and variance $(X)$ = variance $(Y) = 2EN_0(\Lambda_1^2 + \Lambda_2^2) \triangleq \sigma_0^2$. The conditional joint probability density function of X and Y is given by the following expression:

$$U = 2\Lambda_1\Lambda_2 E + \Lambda_1 N_1 + \Lambda_2 N_2^*$$
$$= X + jY$$
$$X = 2\Lambda_1\Lambda_2 E + \text{Re}(\Lambda_1 N_1 + \Lambda_2 N_2^*)$$
$$Y = \text{Im}(\Lambda_1 N_1 + \Lambda_2 N_2^*)$$

-continued $$P(x, y \mid \Lambda_1, \Lambda_2) = \frac{1}{2\pi\sigma_0^2}\exp\{-[(x-\mu)^2 + y^2]/2\sigma_0^2\}$$

and with the change of variables:

$$R = \sqrt{X^2 + Y^2}, \text{ and } \theta = \tan^{-1}\frac{Y}{X}$$

the conditional joint density function of θ and R is given by the following expression:

$$p(r, \theta \mid \Lambda_1, \Lambda_2) = \frac{r}{2\pi\sigma_0^2}\exp\{-(r^2 + \mu^2 - 2\mu r\cos\theta)/2\sigma_0^2\}$$

Integrating over the interval $r \in [0, \infty]$, it can be shown that the probability density function of θ is given by:

$$p_\theta(\theta \mid \Gamma) = \frac{1}{2\pi}\exp(-\Gamma) + \frac{1}{\sqrt{2\pi}}(\sqrt{\Gamma}\cos\theta)\exp(-\Gamma\sin^2\theta)[1 - Q(\sqrt{2\Gamma}\cos\theta)]$$

where:

$$\Gamma = \frac{\Lambda_1^2 \Lambda_2^2}{\Lambda_1^2 + \Lambda_2^2}\frac{E}{N_0}$$

It can be shown that $\Delta'$ is uniformly distributed over the interval $[-\pi, \pi]$. With regions given by $R_i=[-\pi i/M, \pi i/M]$, for $i=1, \ldots, M$, the desired probability of an estimated phase θ in a decision region is given by:

$$Pr(\theta \in R_i) = \frac{1}{2\pi}\int_0^\infty \int_{-\pi}^\pi \int_{R_i} p_\theta(\theta - \delta \mid \Gamma) P(\Gamma) d\theta d\delta d\Gamma$$

Now consider the use of a linear block code having minimum Hamming distance d, dimension k, and block length n. Let $t=[(d-1)/2]$ be the number of errors that can be corrected by the decoder. The probability that the sequences established by the first and second users agree is the probability of the two received vectors being in the same decoding region of a codeword.

Let c be a codeword with Hamming weight 1. Three vectors c, $r_A$, and $r_B$ are available. Rearranging the coordinates of these vectors does not change the performance analysis. One such permutation is as follows:

$$c = \overline{\underbrace{1111111 \ldots 1111}_{l}}\ \overline{\underbrace{0000000 \ldots 00000}_{n-l}}$$

$$r_a = \overline{\underbrace{111 \ldots 11}_{i-j}}\ \overline{\underbrace{000 \ldots 00}_{j}}\ \overline{\underbrace{111 \ldots 11}_{k}}\ \overline{\underbrace{000 \ldots 00}_{n-l-k}}$$

$$r_b = \overline{\underbrace{1 \ldots 1}_{i-j-m_1}}\ \overline{\underbrace{00 \ldots 0}_{m_1}}\ \overline{\underbrace{11 \ldots 1}_{m_2}}\ \overline{\underbrace{00 \ldots 0}_{j-m_1}}\ \overline{\underbrace{11 \ldots 1}_{k-m_3}}\ \overline{\underbrace{00 \ldots 0}_{m_3}}\ \overline{\underbrace{11 \ldots 1}_{m_4}}\ \overline{\underbrace{00 \ldots 0}_{n-k-l-m_1}}$$

The probability that the sequences agree and that the sequence is c can be shown to be given by:

$$P_l = \sum_{j=0}^{l}\sum_{k=0}^{n-1}\sum_{m_1=0}^{l-j}\sum_{m_2=0}^{j}\sum_{m_3=0}^{k}\sum_{m_4=0}^{n-l-k}\binom{n}{\beta}(1-p_g)^\beta p_g^{n-\beta} \quad \text{Eq. 15}$$

where:

$\beta = m_1 + m_2 + m_3 + m_4$ $0 \leq j+k \leq t$ $0 \leq m_1+j-m_2+k-m_3+m_4 \leq t$ Thus, the probability of mutual agreement is given by:

$$Pr(k_A = k_B) = \sum_l A_l P_l$$

where $A_l$ is a weight enumerator function of the code. The probability $P_B$ that the sequence established by the eavesdropper agrees is given by a similar equation substituting $p_b$ for $p_g$. Without the use of a decoder, $Pr(k_A=k_B)=Pr(r_A=r_B)=p_g^n$, and $Pr(k_A=k_E)=Pr(r_A=r_E)=1/M^n$.

It is of interest to discuss the tradeoffs involved in such a sequence agreement system. A small value for the dimension k yields a code with good error correcting capability, but as k decreases the speed with which an exhaustive search can be carried increases exponentially. The choice of the code parameters is crucial since the code restricts the size of the candidate sequence space, but the reduction should not yield an insecure system.

For a large number M of decision regions, a larger code can be used, thereby increasing the computational secrecy of the system; also, $P_b$ decreases, which results in a good probabilistic secrecy. This is not sufficient, however, to obtain a good cryptographic system. With increasing M, thermal noise effects become dominant and an increase in $E_b/N_0$ (ratio of bit energy to noise energy) is required to achieve a sequence agreement with certain probabilistic secrecy. Therefore, a tradeoff exists between computational secrecy, probabilistic secrecy, and transmitted energy.

As another example, consider the use of a (31,13) Reed-Solomon code over GF(32). The size of the code (the number of possible codewords, or bit sequences) is $32^{13}=2^{65}$, and the computational secrecy is substantially better than that of DES $2^{56}$, which is a sequence of a system using the digital encryption standard, consisting of fifty-six secret bits and eight parity bits. The minimum Hamming distance of such a Reed-Solomon code is eighteen.

Figure 11:
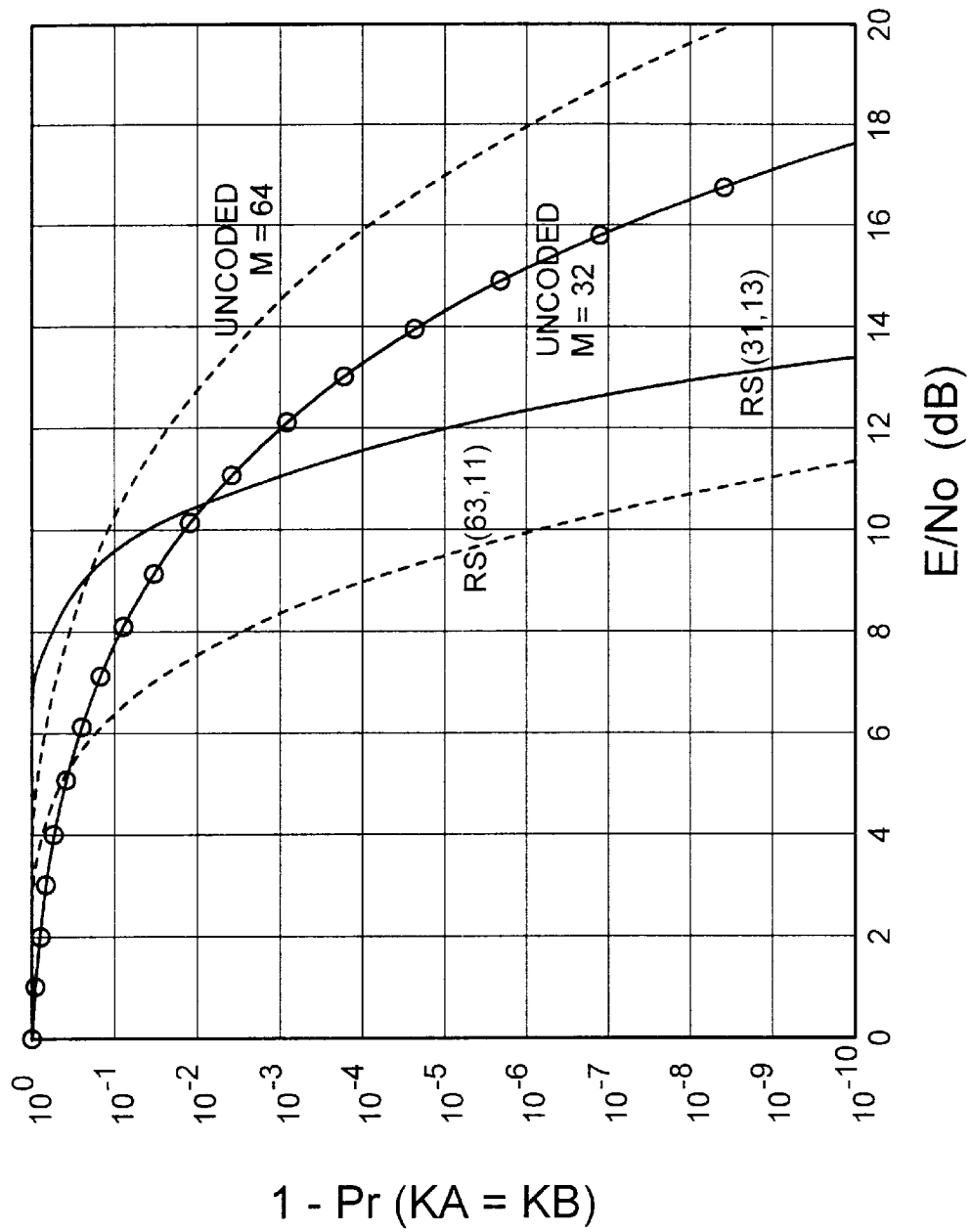
FIG. 11 shows the performance of a communication system in accordance with Applicants' invention.

FIG. 11 shows the performance of a secure communication system that uses such a Reed-Solomon code. Also shown are the performance of a (61,11) Reed-Solomon code and the performances of two uncoded systems. From FIG. 11, it can be seen that, with the use of a channel decoder, the probability that the keys established by the first and second users do not agree is $10^{-8}$ at signal to noise ratios $E_b/N_0$ of 11 dB and 13 dB for M=64 and M=32, respectively. This is a gain of about 9 dB and 4 dB, respectively, compared to a communication system without a decoder. Moreover, $\Pr(k_A=k_E) \cong 0$ and $\Pr(r_A=r_E) \cong 0$ (both are about $10^{-41}$).

In such a system, the use of a decoder is desirable for the first and second users, although not strictly required as described above, but use of a decoder does not help the eavesdropper.

Applicants' sequence agreement methods and apparatus based on the reversibility of a radio channel provide superior computational secrecy as well as probabilistic secrecy. Using Applicants' invention, long arbitrary key sequences can be shared, and a key sequence can be changed even during a communication "session". In a cellular radio telephone system, it would be desirable to establish a new key sequence at least each time a mobile station registered with the communication system, and even perhaps more frequently, such as for each call or each time a predetermined time interval elapses.

Instead of using a linear block code, a secure communication system could employ combs of 2M orthogonal tones transmitted by each user. Such a comb system has the same performance as a block-ode system, but the comb system requires a much larger bandwidth, as required by orthogonal signaling, and a more complex frequency synthesizer for generating the tones.

In either system, the performance measure for security is taken to be probabilistic, and different from the Shannon measure of perfect secrecy. In particular, in the block-code system, the probability of two users' establishing the same secret key sequence is close to one and the probability of an eavesdropper's establishing the same sequence is substantially zero. This is probabilistic secrecy. Also, the number of possible key sequences is large enough that finding the correct sequence by exhaustive search is impractical. This is computational secrecy.

Additionally, exemplary embodiments of Applicants' invention have been described wherein sequence establishment is used to determine a pseudorandom quantity rather than a key sequence. According to these exemplary embodiments, a randomness tester can be provided to screen out those sequences which are insufficiently random for this purpose. Two exemplary applications in which such pseudorandom quantities can be used were provided, specifically spreading sequence determination and hop sequence determination. However, those skilled in the art will appreciate that pseudorandom quantities which are generated in accordance with the present invention can be used as part of any function which requires a pseudorandom quantity as an input. For example, any function implemented in a base station or a mobile station wherein a pseudorandom quantity is needed which is known to both the mobile station and the base station that are connected via a radio channel, can be implemented according to the present invention.

While particular embodiments of Applicants' invention have been described and illustrated, it should be understood that the invention is not limited thereto. This application contemplates any and all modifications that fall within the spirit and scope of Applicant's invention as defined by the following claims.

What is claimed is:

1. A method of establishing a pseudorandom sequence for use in communication between a first radio transceiver and a second radio transceiver in a radio communication system comprising the steps of:

in the first radio transceiver, transmitting a plurality of sinusoidal signals, each sinusoidal signal having a respective predetermined frequency and a predetermined initial phase;

in the second radio transceiver, detecting the plurality of sinusoidal signals transmitted by the first radio transceiver, and transmitting the plurality of sinusoidal signals after a predetermined time period;

in each of the first and second radio transceivers, determining a phase of each of the plurality of sinusoidal signals received from the other radio transceiver;

in each of the first and second radio transceivers, determining differences between the phases of pairs of the sinusoidal signals received;

in each of the first and second radio transceivers, quantizing each difference into a respective one of a plurality of phase decision values; and in each of the first and second radio transceivers, using a plurality of the quantized differences as a potential pseudorandom sequence.

2. The method of claim 1, further comprising the step of:

evaluating a randomness of said potential pseudorandom sequence and selectively outputting said potential pseudorandom sequence as a pseudorandom sequence based on said evaluation.

3. The method of claim 2, further comprising the step of comparing said randomness with a randomness threshold.

4. The method of claim 3, wherein said step of comparing further comprises selecting said randomness threshold based upon system load.

5. The method of claim 2, wherein said step of selectively outputting comprises the step of:

using said pseudorandom sequence as a spreading sequence in a CDMA radio communication system.

6. The method of claim 2, wherein said step of selectively outputting further comprises the step of:

using said pseudorandom sequence as a hop sequence.

7. A method of establishing a pseudorandom sequence for use in communication between a first radio transceiver and a second radio transceiver comprising the steps of:

in the first radio transceiver, transmitting a predetermined digital word including a plurality of bits;

in the second radio transceiver, detecting the predetermined digital word transmitted by the first radio transceiver, and transmitting the predetermined digital word after a predetermined time period;

in each of the first and second radio transceivers, hard-decision decoding each of the plurality of bits in the predetermined digital word received from the other radio transceiver; and in each of the first and second radio transceivers, mapping the hard-decision decoded plurality of bits into a potential pseudorandom sequence according to a predetermined block code.

8. The method of claim 7, further comprising the step of:

evaluating a randomness of said potential pseudorandom sequence and selectively outputting said potential pseudorandom sequence as a pseudorandom sequence based on said evaluation.

9. The method of claim 8, further comprising the step of comparing said randomness with a randomness threshold.

10. The method of claim 9, wherein said step of comparing further comprises selecting said randomness threshold based upon system load.

11. The method of claim 8, wherein said step of selectively outputting comprises the step of:

using said pseudorandom sequence as a spreading sequence in a CDMA radio communication system.

12. The method of claim 8, wherein said step of selectively outputting further comprises the step of:

using said pseudorandom sequence as a hop sequence.

13. A method of establishing a pseudorandom sequence for use in communication between a first radio transceiver and a second radio transceiver comprising the steps of:

in the first radio transceiver, transmitting a predetermined digital word including a plurality of bits;

in the second radio transceiver, detecting the predetermined digital word transmitted by the first radio transceiver, and transmitting the predetermined digital word after a predetermined time period;

in each of the first and second radio transceivers, determining a phase of each of the plurality of bits received from the other radio transceiver;

in each of the first and second radio transceivers, determining a difference between each phase determined and a respective predetermined phase;

in each of the first and second radio transceivers, quantizing each difference into a respective one of a plurality of phase decision values; and in each of the first and second radio transceivers, decoding a plurality of the quantized differences into a potential pseudorandom sequence according to a predetermined block code.

14. The method of claim 13, further comprising the step of:

evaluating a randomness of said potential pseudorandom sequence and selectively outputting said potential pseudorandom sequence as a pseudorandom sequence based on said evaluation.

15. The method of claim 14, further comprising the step of comparing said randomness with a randomness threshold.

16. The method of claim 15, wherein said step of comparing further comprises selecting said randomness threshold based upon system load.

17. The method of claim 14, wherein said step of selectively outputting comprises the step of:

using said pseudorandom sequence as a spreading sequence in a CDMA radio communication system.

18. The method of claim 14, wherein said step of selectively outputting further comprises the step of:

using said pseudorandom sequence as a hop sequence.

19. An apparatus for establishing a pseudorandom sequence for use in communication between a first radio transceiver and a second radio transceiver comprising:

in the first radio transceiver, means for transmitting a plurality of sinusoidal signals, each sinusoidal signal having a respective predetermined frequency and a predetermined initial phase;

in the second radio transceiver, means for detecting the plurality of sinusoidal signals transmitted by the first radio transceiver, and for transmitting the plurality of sinusoidal signals at a predetermined time after the beginning is detected;

in each of the first and second radio transceivers, means for determining a phase of each of the plurality of sinusoidal signals received from the other radio transceiver;

in each of the first and second radio transceivers, means for determining differences between the phases of pairs of the sinusoidal signals received;

in each of the first and second radio transceivers, means for quantizing each difference into a respective one of a plurality of phase decision values; and in each of the first and second radio transceivers, means for decoding a plurality of the quantized differences into a potential pseudorandom sequence according to a predetermined block code.

20. The apparatus of claim 19, further comprising:

means for evaluating a randomness of said potential pseudorandom sequence and selectively outputting said potential pseudorandom sequence as a pseudorandom sequence based on said evaluation.

21. The apparatus of claim 20, further comprising:

means for comparing said randomness with a randomness threshold.

22. The apparatus of claim 21, wherein said means for comparing further comprises selecting said randomness threshold based upon system load.

23. The apparatus of claim 20, wherein said means for selectively outputting further comprises:

means for using said pseudorandom sequence as a spreading sequence in a CDMA radio communication system.

24. The apparatus of claim 20, wherein said means for selectively outputting further comprises:

means for using said pseudorandom sequence as a hop sequence.

25. An apparatus for establishing a pseudorandom sequence for use in communication between a first radio transceiver and a second radio transceiver comprising:

in the first radio transceiver, means for transmitting a predetermined digital word including a plurality of bits;

in the second radio transceiver, means for detecting the predetermined digital word trnsmitted by the first radio transceiver, and for transmitting the predetermined digital word after a predetermined time period;

in each of the first and second radio transceivers, means for hard-decision decoding each of the plurality of bits in the predetermined digital word received from the other radio transceiver; and in each of the first and second radio transceivers, means for mapping the hard-decision decoded plurality of bits into a potential pseudorandom sequence according to a predetermined block code.

26. The apparatus of claim 25, further comprising:

means for evaluating a randomness of said potential pseudorandom sequence and selectively outputting said potential pseudorandom sequence as a pseudorandom sequence based on said evaluation.

27. The apparatus of claim 26, further comprising:

means for comparing said randomness with a randomness threshold.

28. The apparatus of claim 27, wherein said means for comparing further comprises selecting said randomness threshold based upon system load.

29. The apparatus of claim 26, wherein said means for selectively outputting further comprises:

means for using said pseudorandom sequence as a spreading sequence in a CDMA radio communication system.

30. The apparatus of claim 26, wherein said means for selectively outputting further comprises:

means for using said pseudorandom sequence as a hop sequence.

31. An apparatus for establishing a pseudorandom sequence for use in communication between a first radio transceiver and a second radio transceiver comprising:

in the first radio transceiver, means for transmitting a predetermined digital word including a plurality of bits;

in the second radio transceiver, means for detecting the predetermined digital word transmitted by the first radio transceiver, and for transmitting the predetermined digital word after a predetermined time period;

in each of the first and second radio transceivers, means for determining a phase of each of the plurality of bits received from the other radio transceiver;

in each of the first and second radio transceivers, means for determining a difference between each phase determined and a respective predetermined phase;

in each of the first and second radio transceivers, means for quantizing each difference into a respective one of a plurality of phase decision values; and in each of the first and second radio transceivers, means for decoding a plurality of the quantized differences into a potential pseudorandom sequence according to a predetermined block code.

32. The apparatus of claim 31, further comprising:

means for evaluating a randomness of said potential pseudorandom sequence and selectively outputting said potential pseudorandom sequence as a pseudorandom sequence based on said evaluation.

33. The apparatus of claim 32, further comprising:

means for comparing said randomness with a randomness threshold.

34. The apparatus of claim 33, wherein said means for comparing further comprises selecting said randomness threshold based upon system load.

35. The apparatus of claim 32, wherein said means for selectively outputting further comprises:

means for using said pseudorandom sequence as a spreading sequence in a CDMA radio communication system.

36. The apparatus of claim 32, wherein said means for selectively outputting further comprises:

means for using said pseudorandom sequence as a hop sequence.

37. A radio station comprising:

a radio transceiver for detecting predetermined characteristics of a radio channel; and a processor for using said, detected predetermined characteristics to determine a pseudorandom sequence.

38. The radio station of claim 37, wherein said predetermined characteristics include phase differences between a plurality of signals received by said radio transceiver.

39. The radio station of claim 38, wherein said processor further comprises:

means for determining a potential pseudorandom sequence based on said phase differences; and a randomness tester for evaluating said potential pseudorandom sequence and selectively outputting said potential pseudorandom sequence as said pseudorandom sequence.

40. The radio station of claim 39, wherein said randomness tester further comprises:

a threshold comparator for determining if said potential pseudorandom sequence exceeds a predetermined randomness threshold.

41. The radio station of claim 37, further comprising:

a hop sequence generator for periodically selecting a frequency based upon said pseudorandom sequence, said selected frequency being used to tune said radio transceiver.

42. The radio station of claim 37, further comprising:

a spreading device for spreading or despreading data symbols used in said radio transceiver, said spreading device using said pseudorandom sequence to determine said spreading sequence.

43. The radio station of claim 37, wherein said radio station is a mobile station.

44. The radio station of claim 37, wherein said radio station is a base station.

* * * * *